(12) United States Patent
Hulaj

(10) Patent No.: US 11,995,662 B2
(45) Date of Patent: *May 28, 2024

(54) METHODS AND SYSTEMS RELATING TO BROKERING ASSET DATA

(71) Applicant: Steven Hulaj, Kanata (CA)

(72) Inventor: Steven Hulaj, Kanata (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/816,244

(22) Filed: Jul. 29, 2022

(65) Prior Publication Data

US 2022/0383371 A1 Dec. 1, 2022

Related U.S. Application Data

(63) Continuation of application No. 14/860,964, filed on Sep. 22, 2015, now Pat. No. 11,475,460.

(60) Provisional application No. 62/053,376, filed on Sep. 22, 2014, provisional application No. 62/053,265, filed on Sep. 22, 2014.

(51) Int. Cl.
*G06Q 30/00* (2023.01)
*G06Q 30/018* (2023.01)
*G06Q 30/0601* (2023.01)
*G06Q 50/00* (2012.01)

(52) U.S. Cl.
CPC ....... *G06Q 30/018* (2013.01); *G06Q 30/0609* (2013.01); *G06Q 50/01* (2013.01)

(58) Field of Classification Search
CPC ... G06Q 30/018; G06Q 30/0609; G06Q 50/01
USPC .............................. 705/26.1–27.2
See application file for complete search history.

(56) References Cited

U.S. PATENT DOCUMENTS

| 2006/0143068 A1 | 6/2006 | Calabria |
| 2012/0324242 A1 | 12/2012 | Kirsch |
| 2013/0092738 A1 | 4/2013 | Blasinski et al. |

OTHER PUBLICATIONS

Fayazi, Amir A (2013) "Detecting Crowdsourced Spam Reviews in Social Media" Master's Thesis, Texas A&M University.

*Primary Examiner* — Anand Loharikar
(74) *Attorney, Agent, or Firm* — Rosenberg, Klein & Lee

(57) ABSTRACT

Individuals, families, and organizations all acquire assets ranging from tens to hundreds to tens of thousands. Each asset defines aspects of the acquirer and provides information to third parties as well as for the acquirer. This information includes ownership, asset experiences etc. shared with other users and/or enterprises who made it, support it, appreciate it, etc., the retailer who sold it, those who follow these assets or seek to provide improvements, enhancements, alternatives, etc. or exploit the asset ownership characteristics to target information. However, asset owners generally wish to remain anonymous yet benefit from third party knowledge of their ownership. Accordingly, a system and method of providing asset ownership brokering to derive benefit without providing confidential information to other users and/or enterprises is provided.

21 Claims, 14 Drawing Sheets

METHODS AND SYSTEMS RELATING TO BROKERING ASSET DATA

CROSS-REFERENCE TO RELATED APPLICATIONS

This patent application claims the benefit of priority from U.S. patent application Ser. No. 14/860,964 filed Sep. 22, 2015; which itself claims the benefit of priority from U.S. Provisional Patent Application 62/053,265 filed Sep. 22, 2014; and the benefit of priority from U.S. Provisional Patent Application 62/053,376 filed Sep. 22, 2014; the entire contents of each being incorporated herein by reference.

FIELD OF THE INVENTION

This invention relates to asset data and more particularly to methods of brokering and exploiting that asset data.

BACKGROUND OF THE INVENTION

An individual will through their life acquire assets both tangible and intangible. In many instances these assets may be a necessity whereas others are a choice based upon a user's desire to acquire an asset or assets from their disposable income, for example. Irrespective of whether an asset is a necessity or not, the choice of that asset by that individual, group or enterprise defines aspects of the individual, group or enterprise as well as provides data that can form the basis upon which to select/filter the individual, group or enterprise etc. In some instances the user, be it an individual, group or enterprise, may make their acquisition of the asset known whereas in other instances the user may not wish to make this knowledge (data) public.

However, this data associated with the assets acquired, and additional data which an individual, group or enterprise collects, creates or links to that asset, whether or not they involve a financial transaction, has value be it to the user themselves or to others. This value may exist for the user in allowing them to track aspects of the assets, such as warranty renewal/membership fees, current asset status, asset or maintenance schedules etc. Alternatively, that value may be in allowing friends or a subset of the public at large to view aspects of the assets or allowing data relating to the asset and the user to be viewed within social networks, bulletin boards, blogs, online communities or made available to other data sources etc. In other instances the value may be derived based upon data relayed to other users and/or enterprises, for example, who may wish to react to or act upon this data and/or changes in this data. The assets could be an item made by a user or one the user acquired/purchased, and the user shares ownership and/or the users asset experiences to other users and/or enterprises who made it, support it, appreciate it, etc., the retailer who sold it, or those who follow these assets, rate your opinions in respect of ownership of assets, or seek to provide improvements, enhancements, alternatives, etc. based upon the asset or exploit the asset ownership characteristics to target information.

However, an individual may have tens, hundreds of tangible assets and thousands of intangible assets and enterprises may possess one or many orders of magnitude more. In other instances the user may wish to remain anonymous whilst benefiting from third party knowledge of their ownership of the asset. Accordingly, it would be provide users with an ability to broker their asset ownership in manner that allows them and others to derive benefit without requiring that the user provide confidential information to a large number of other users and/or enterprises unless they expressly choose to do so rather than being required and/or feeling compelled to provide that information.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to asset data and more particularly to methods of brokering and exploiting that asset data.

In accordance with an embodiment of the invention there is provided a method of associating data relating to a purchase made by a user with the user and with at least one of a specific item and specific service.

In accordance with an embodiment of the invention there is provided a method of associating data relating to a purchase made by a user with the user and with at least one of a specific item and specific service in dependence upon the user providing checkout information to a software application that automatically accesses and identifies the specific item within databases associated with at least one of a retailer, a manufacturer, and a distributor based upon information within the checkout information.

In accordance with an embodiment of the invention there is provided a method of associating data relating to a purchase made by a user with the user and with at least one of a specific item and specific service in dependence upon the user providing product information to a brokering service that engages databases of a plurality of manufacturers to identify and associate additional information relating to the at least one of a specific item and specific service with the user.

In accordance with an embodiment of the invention there is provided a method of allowing a user to associate within a single online resource data associated with an asset associated with the user wherein the data associated with the asset is acquired from sources other than the single online resource data.

In accordance with an embodiment of the invention there is provided a method of verifying to a third party associated with online social media content that a poster of content relating to an asset is a legitimate owner of the asset.

In accordance with an embodiment of the invention there is provided a method of displaying to a user of online social media content that a poster of content relating to an asset within the online social media content is a legitimate owner of the asset by verification of the poster's asset with the manufacturer.

In accordance with an embodiment of the invention there is provided a method of providing to a user of online social media content an additional hyperlink relating to an item of posted online content, wherein the additional hyperlink is only provided when the poster of the content relating to an asset within the online social media content is verified as a legitimate owner of the asset by verification of the poster's asset.

In accordance with an embodiment of the invention there is provided a method of adding content to a social media post through providing at least a plurality of glyphs within the social media post, wherein the plurality of glyphs represent predetermined sections of a code.

In accordance with an embodiment of the invention there is provided a method of associating data relating to a purchase made by a user to a brokering service that engages databases of a plurality of manufacturers and services providers who can then query the users entire items or services, or classes and types of specific items or services which known by the invention to be owned by the user and to then provide suggestions to the user for optional items or services for specific items or services known by the invention to be owned by the user but not known to be owned by the user by the manufacturers and services providers making the offer, and to optionally allow the user to receive these offers and by opting to remain anonymous or not throughout the purchase process and remain anonymous after the purchase of the item or service.

In accordance with an embodiment of the invention there is provided a method of associating data relating to previous purchases or services used which the invention knows have been previously made by a user and a brokering service that engages databases of a plurality of manufacturers and services providers who are able to engage the invention to query a user's entire list of items or services, or classes and types of specific items or services which are known by the invention to be owned or used by a user and which are not known by the manufacturers and service providers to be owned or used by the user at the time of engaging the invention, and to then receive from invention matching criteria or suggested needs back to the manufacturers and service providers so as to allow the manufacturers or service producers to provide, by way of the invention, suggestions, advertisements, notifications or purchase offers to the user by way of a notification, advertisement or recommendation for other optional items or services from the manufacturer or service provider for new or related items or services to the users known items and to do so through the invention by not disclosing the actual items and services owned or used by the user or the users name or other private and identifiable information until which time the user completes the purchase of the offered items or service from the manufacturer or service provider and which affords the optional ability during the purchase process to allow the user to disclose their identifiable information to the manufacturer or services provider or to remain anonymous by allowing the invention to broker the knowledge of the item or service purchased by the user and validating the relationship between the user and the manufacturer or services provider via the inventions server and database.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
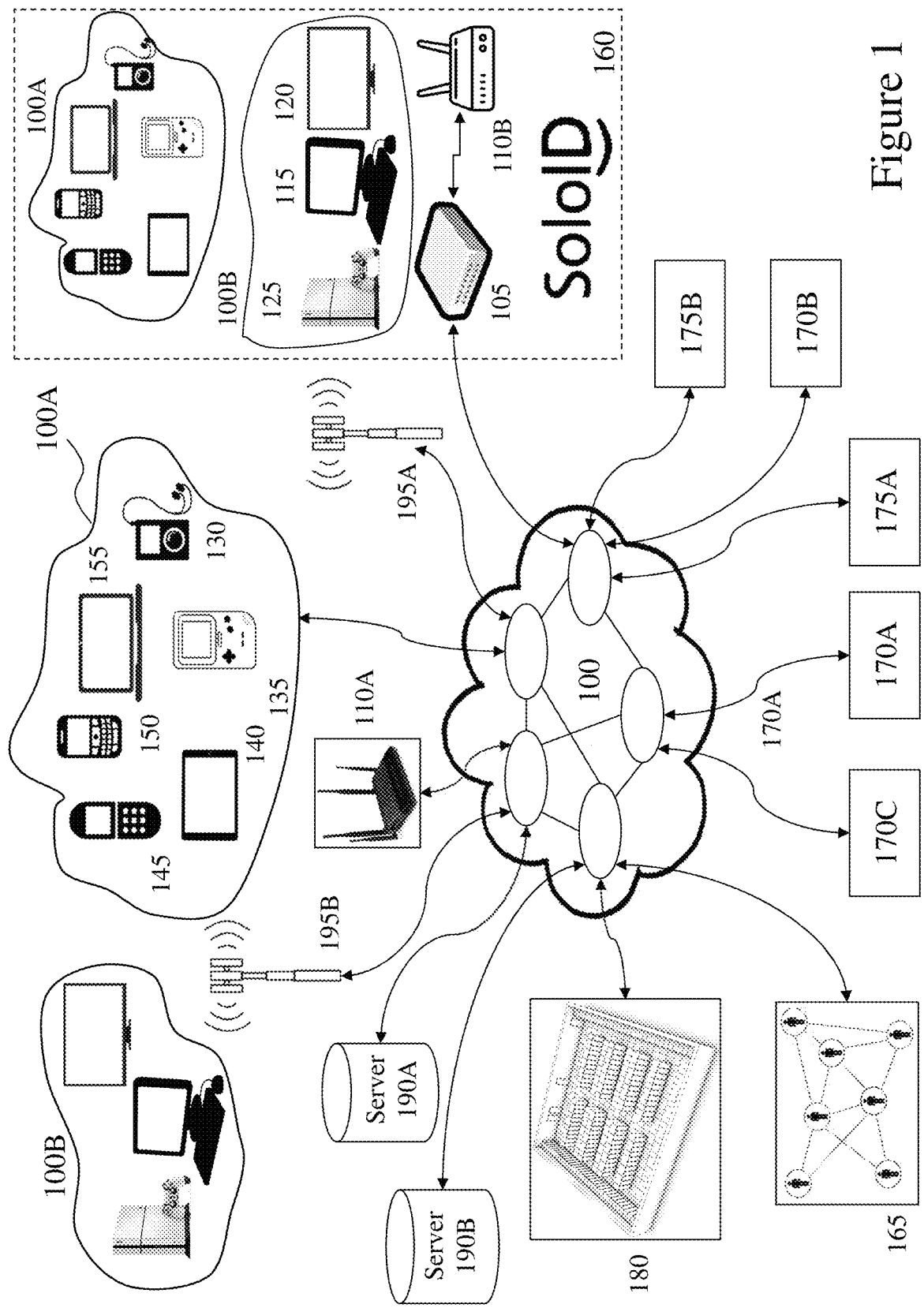
FIG. 1 depicts a network environment within which embodiments of the invention may be employed.

The present invention is directed to asset data and more particularly to methods of brokering and exploiting that asset data.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Elements identified within figures having the same reference numeral are the same element, device, assembly, step, process, etc. as originally defined.

A "portable electronic device" (PED) as used herein and throughout this disclosure, refers to a wireless device used for communications and other applications that requires a battery or other independent form of energy for power. This includes devices, but is not limited to, such as a cellular telephone, a smartphone, a personal digital assistant (PDA), a portable computer, pager, a portable multimedia player, a portable gaming console, a laptop computer, a tablet computer, a wearable device, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

An "asset" as used herein may refer to, but is not limited to, anything tangible or intangible that is capable of being owned or controlled by a user. Assets include, but are not limited to, those items commonly referred to as products, property, estate, holdings, possessions, effects, goods, valuables, belongings, and chattels. Assets may include, but not be limited to, vehicles, electronics, appliances, software, electronic content, furniture, sports equipment, jewelry, and clothing.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, a retailer, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider or their designates.

A "user" as used herein may refer to, but is not limited to, an individual or group of individuals whose data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, and graphical user interface. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by data relating to a subset of conditions including, but not limited to, their environment, consumable materials, upgrades, and replacement parts.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Referring to FIG. 1 there is depicted a network environment 100 within which embodiments of the invention may be employed supporting digital systems and digital applications/platforms (DSDAPs) according to embodiments of the invention. Such DSDAPs, for example supporting multiple channels and dynamic content. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. SoloID™, within which other first and second user groups 100A and 100B are also present. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 and Bluetooth as well in an ad-hoc manner.

Also connected to the network 100 are Social Networks (SOCNETS) 165, first to third retailers 170A to 170C respectively, e.g. Best Buy™, Circuit City™, and Wal-Mart™, and first to second online retailers 175A and 175B respectively, e.g. Amazon™ and eBay™, as well as first and second servers 190A and 190B which together with others, not shown for clarity. First and second servers 190A and 190B may host according to embodiments of the inventions multiple services associated with a provider of data systems and data applications/platforms (DSDAPs); a provider of a SOCNET or Social Media (SOME) exploiting DSDAP features; a provider of a SOCNET and/or SOME not exploiting DSDAP features; a provider of services to PEDS and/or FEDS; a provider of one or more aspects of wired and/or wireless communications; an Enterprise 160 exploiting DSDAP features; license databases; content databases; image databases; content libraries; customer databases; websites; and software applications for download to or access by FEDs and/or PEDs exploiting and/or hosting DSDAP features. First and second primary content servers 190A and 190B may also host for example other Internet services such as a search engine, financial services, third party applications and other Internet based services.

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides DSDAP features according to embodiments of the invention; execute an application already installed providing DSDAP features; execute a web based application providing DSDAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
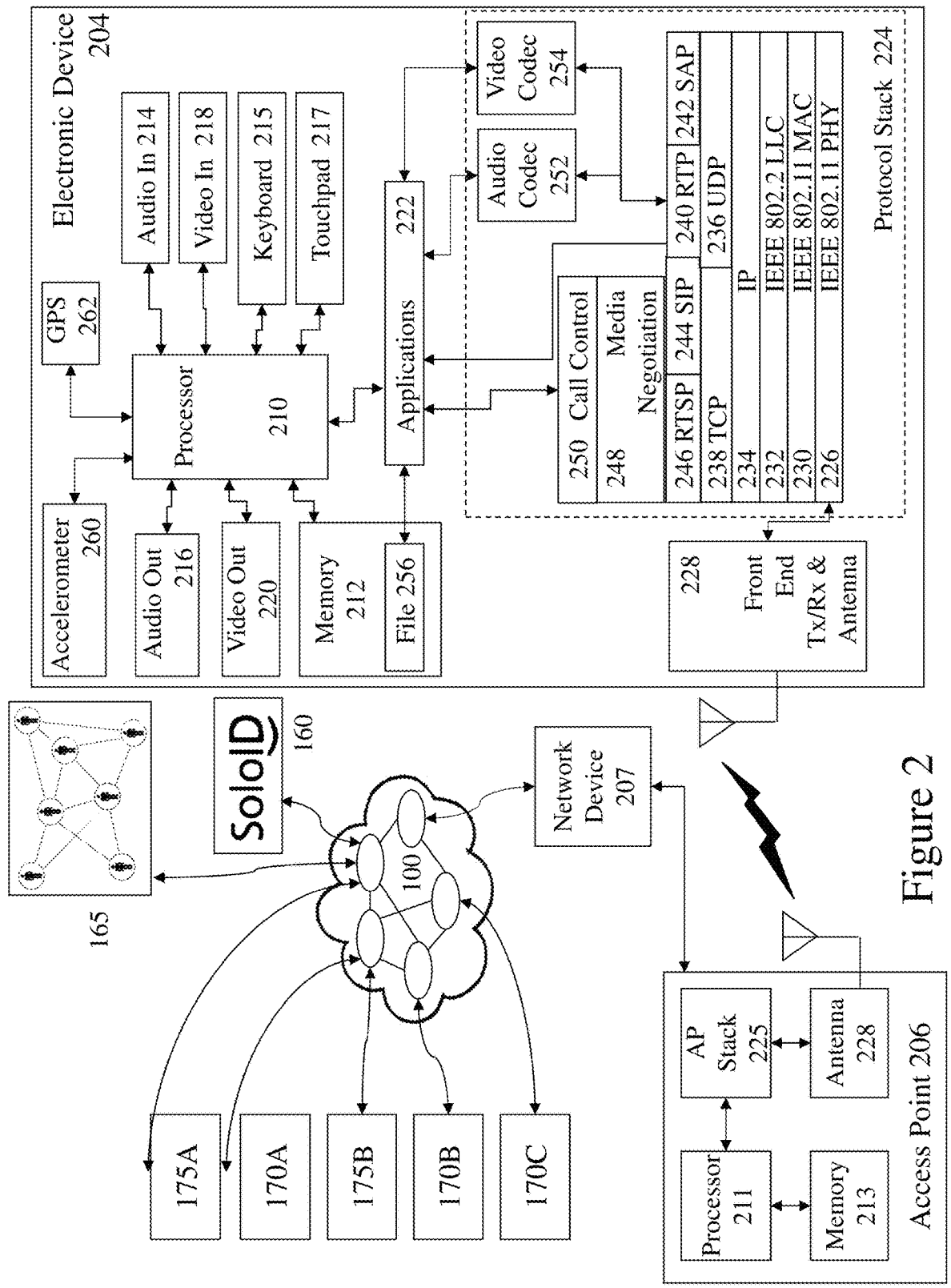
FIG. 2 depicts a wireless portable electronic device supporting communications to a network such as depicted in FIG. 1 and as supporting embodiments of the invention.

Now referring to FIG. 2 there is depicted an electronic device 204 and network access point 207 supporting DSDAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, first to third retailers 170A to 170C respectively, e.g. Best Buy™, Circuit City™, and Wal-Mart™, and first to second online retailers 175A and 175B respectively, e.g. Amazon™ and eBay™, as well as first and second servers 190A and 190B which together with others, not shown for clarity.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figure 3:
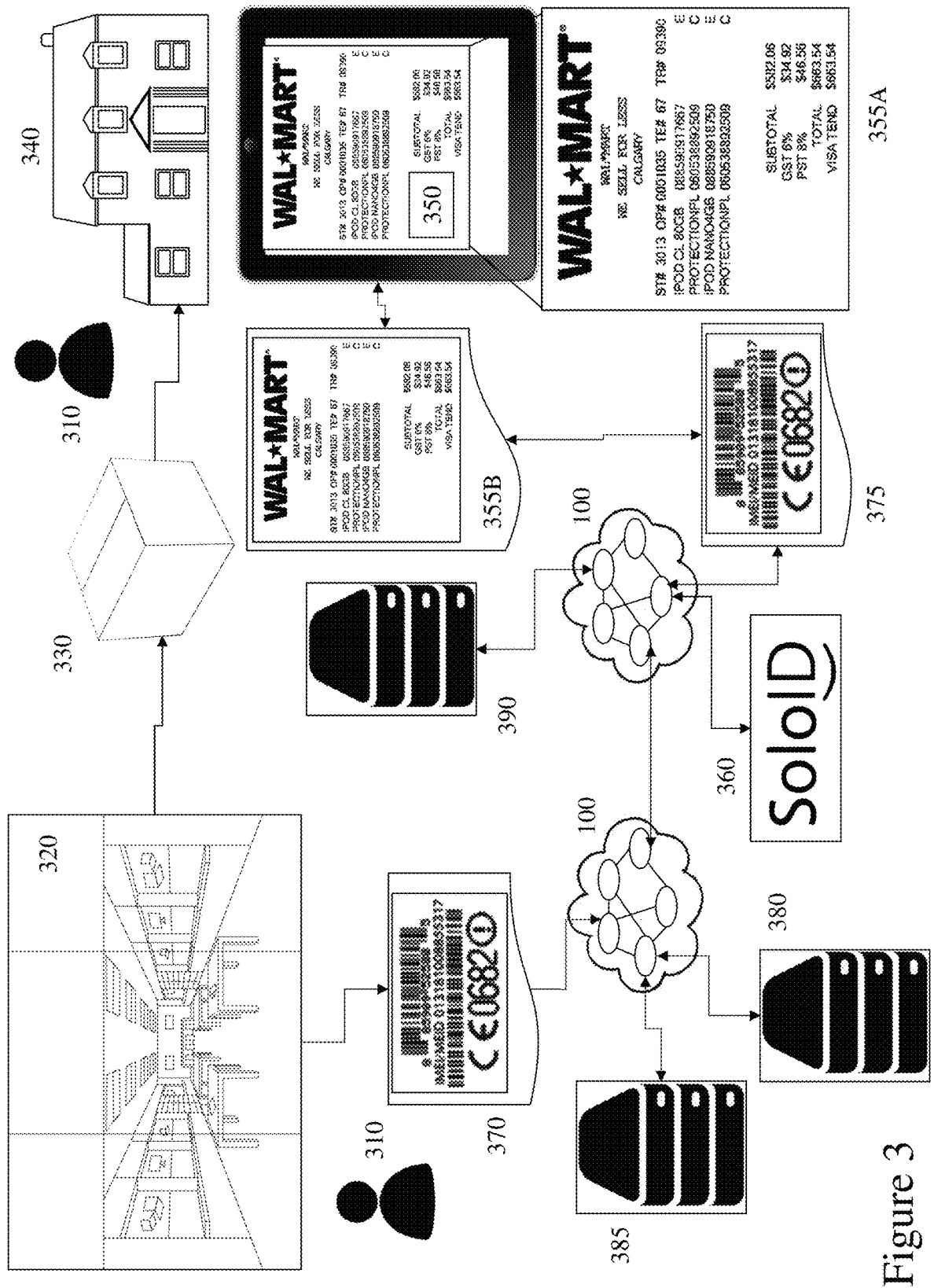
FIGS. 3 to 5 depict an asset brokering methodology according to embodiments of the invention with respect to firmware upgrades and product updates.
Figure 4:
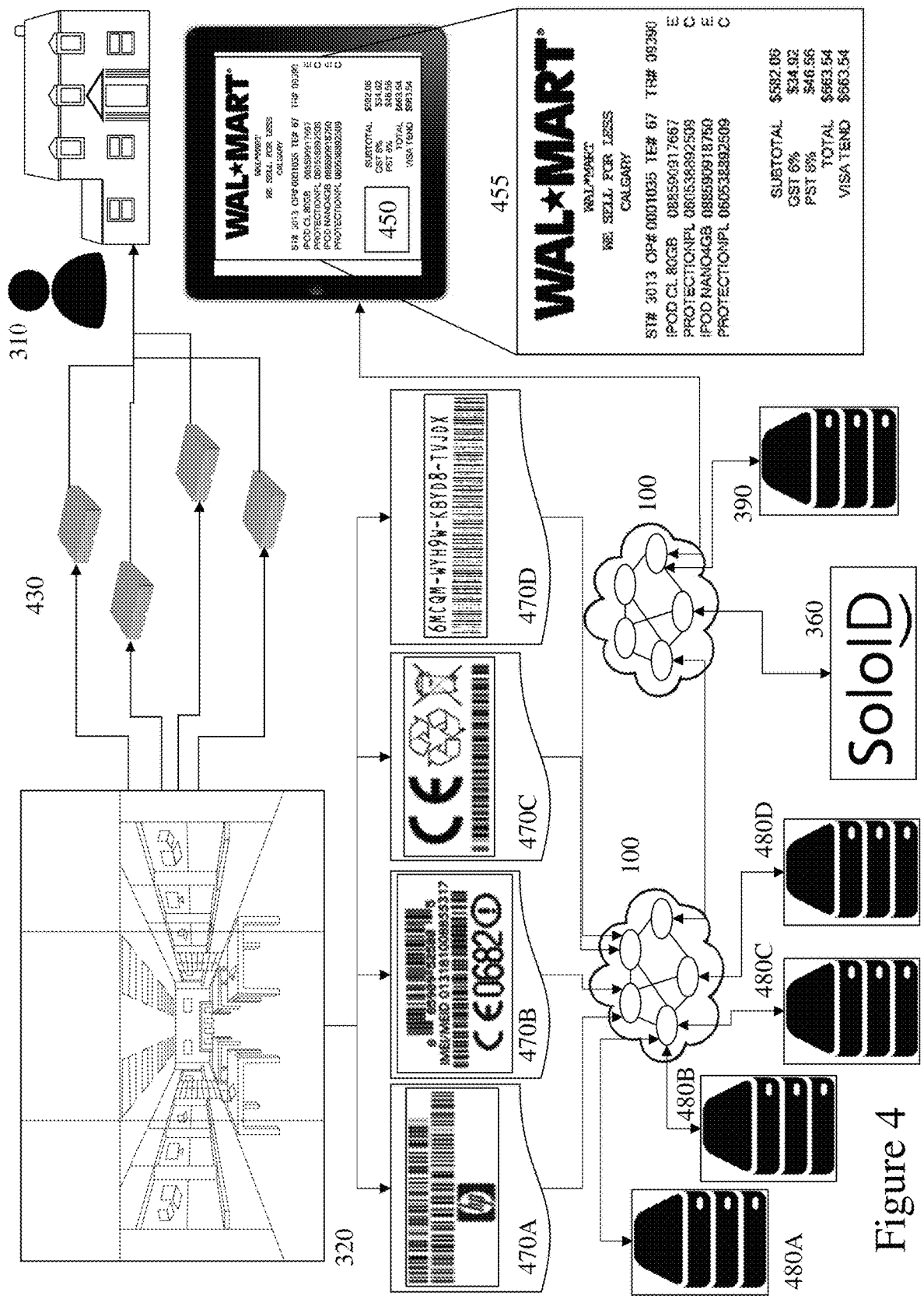
Figure 5:
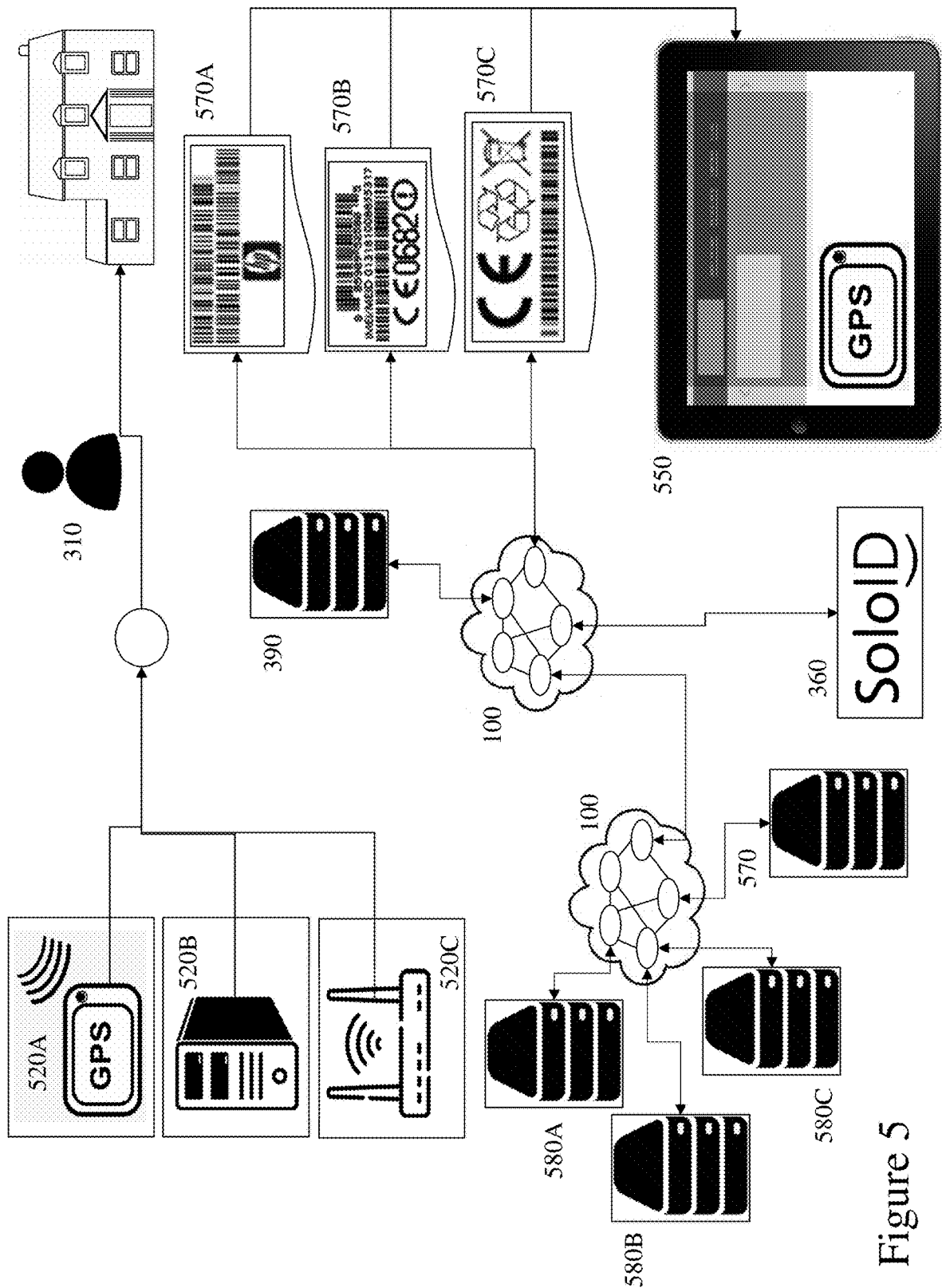

Now referring to FIGS. 3 to 5 there are depicted asset brokering methodologies according to embodiments of the invention with respect to firmware upgrades and product updates. Referring initially to FIG. 3 there is depicted an exemplary schematic for a user purchasing an asset and associating this with their assets in order to provide access to product related information such as firmware upgrades, product offers, recall notices, memberships, annual renewals etc. without disclosing any or additional personal information to the manufacturer, retailer, etc. Accordingly, a user 310 visits a retail outlet 320 in order to acquire an asset 330, e.g. a camera. Their purchase of the asset 330 triggers the retail outlet 320 to update their inventory records via product data 370 to remote server 380, as well as others potentially which are not shown for clarity, via network 100. The product data 370 transmitted from retail outlet 320 to their databases upon one or more remote servers 380, may include the retailer's stock keeping unit (SKU), the manufacturer's original SKU, a third party enterprise SKU (e.g. a distributor) as well as data relating to unique identity of the asset, quantity, time, location, retailer employee, payment method, and user financial payment data. Subsequently, the retailer systems upon server 380 provide to others, e.g. a distributor, the manufacturer, etc. information relating to the sale of the asset. This information may include, for example, the unique identity of the asset, quantity, time, and location of sale such that the distributor/manufacturer recognize the sales of the retailer associated with retail outlet 320 is transmitted via network 100 to database server 385.

Subsequently, the user 310 upon returning to a location 340, e.g. their home, office, family residence, place of work, etc. accesses DSDAP 360 via their PED or FED. In the first instance of the user accessing the DSDAP 360 the user creates an account using one of the methods known within the prior art wherein user registration data is stored upon one or more databases within DSDAP server(s) 390. Subsequently, the user 310 may access their account and manage assets and/or account information plus as described below in respect of FIGS. 3 to 12 trigger/manage actions, transmit/receive content, provide/receive notifications, etc. As depicted in FIG. 3 the user 310 accesses the DSDAP 360 via a PED 350 which may, according to embodiments of the invention, be via web browser, user interface, and/or an application upon the PED 350.

As depicted in FIG. 3 the user acquires a digital representation of their receipt 355A which is subsequently transferred as electronic receipt 355B to the DSDAP 360 and/or DSDAP databases upon DSDAP server(s) 390. In this instance, the electronic receipt 355A includes all of or a subset of the description of assets acquired and unique reference identifiers in addition to the cost, retailer information, location, time, and financial transaction data. In this instance, the assets purchased were an Apple™ 80 Gb iPod™ with protection plan and an Apple™ 4Gb iPod Nano™ with protection plan. Accordingly, DSDAP 360 engages retail outlet 320 via their databases upon one or more remote servers 380 to associate a unique identifier of the user 310 generated by DSDAP 360 with the purchased assets within the retailer 310 databases. Optionally as an alternative and/or additional step the DSDAP 360 engages manufacturer/distributor via their databases upon database server(s) 385 to associate a unique identifier of the user 310 generated by DSDAP 360 with the purchased assets. In the instance shown these engagements with the retailer, manufacturer, and/or distributor may include information relating to other services purchased by the user 310 where these relate to services provided by the retailer, manufacturer, third party and/or distributor. For example, a service plan may be offered by the retailer alone or it may be offered by the retailer in conjunction with the manufacturer, or between the retailers and a third party but services may or may not actually be provided under this service plan by a third party.

Subsequently, any firmware update, product recall, product upgrade information, etc. relating to an asset identified within one or more of the manufacturer, retailer, distributor, third party enterprise databases having one or more DSDAP 360 identities associated is transmitted to DSDAP 360 and its database(s) upon DSDAP server(s) 390. Notification(s) relating to affected assets by the firmware update, product recall, product upgrade information, etc. may then be communicated from DSDAP 360 to the user(s) 310. Accordingly, the user(s) 310 may elect whether to act upon the firmware update, product recall, product upgrade information, etc. or ignore, wait, etc. In this manner, user(s) 310 may be anonymous to the retail outlet 320, manufacturer, distributor etc. in respect of not having to provide electronic contact information, e.g. email address, SOCNET identity, etc., in order to obtain information regarding the firmware update, product recall, product upgrade information, etc. It would be evident to one skilled in the art that such methodologies as depicted and described in respect of FIG. 3 may operate irrespective of the financial payment means the user employs with the retailer.

Optionally, the DSDAP 360 may allow a user 310 to establish preferences in respect of firmware update, product recall, product upgrade information, etc. including, but not limited to, automatically accepting firmware updates; establishing notifications to be provided at defined intervals e.g. weekly, monthly, etc.; establishing that notifications are only provided a predetermined wait time after their issuance, e.g. 1 day, 3 days, 1 week, etc.; and grouping notifications such as by category, type of notification, manufacturer, etc. It would be evident that some actions may, using selection tools known in the prior art, allow a user to select all assets, categories of assets, manufacturers, etc. to set preferences against. For example, a user may establish to automatically apply all updates from Microsoft for their software but receive monthly notifications for their other software and hardware.

Optionally, the notifications may be turned off by the user and rather than electing to receive notifications outlining the products/updates/upgrades they receive the actual updates/upgrades. In the latter case the user may find that updates/upgrades are automatically applied that they had wished were not but can at least schedule that updates/upgrades are provided at a time that suits them to allow their execution. In the former case then within the notification the user may select which updates to receive and implement. In this scenario non-installed/downloaded updates are tracked and provided as part of the next scheduled notification. In the event that an update is not successfully installed then the user may through their profile easily access the updates for the affected asset(s) and select to have these re-supplied. Further, in the event of an issue the user may through the DSDAP records ascertain all updates they accept/received and installed.

Accordingly, according to the embodiment of the invention described in respect of FIG. 3 it would be evident that the methodology addresses the management of products and/or assets. Many products and/or assets have firmware which needs to be or optionally can be updated. Even where the firmware needs to be updated the timing of this may not be convenient to the user. According to embodiments of the invention all assets/products of a user are registered with an approval gateway, the DSDAP, which determines which products either will be updated by provisioning the updates/upgrades to them and/or determines which products and their pending updates/upgrades shall be communicated to the user for determination whether to proceed or not. Accordingly, a user may elect to receive quarterly updates for software in respect of HP printers, scanners, etc. they possess. At one end of the spectrum these updates are all provided and may according to the files provided by the vendor, e.g. HP, be automatically updated. At the other end of the spectrum the user may be told there are 15, for example, updates available but elects to download two.

Within the DSDAP the user may establish rules for the updating of firmware/software. In the instance of an application the DSDAP application allows the user to register products with themselves as the owner or caretaker of that product and then the user can set rules which dictate which products/manufacturers/distributors or other parties are able to either directly update the user's firmware and/or software or provide the updates/upgrades to the user.

Within an alternate embodiment of the invention the DSDAP receives notifications of updates/upgrades relating to products/assets including those of a specific user. As the DSDAP knows the specific owners of particular products affected by a product update/upgrade/recall and the rules for notifying/applying the product update/upgrade then the DSDAP acts as a gateway controlled through the DSDAP application installed upon the user's PED and/or FED. If the user elects to receive every notification without permitting automatic updates then their DSDAP application provides them with full brokering capabilities and the network 100, i.e. the Internet or cloud, acts as a resource highway. The DSDAP allows the user to keep ownership information private from the party/enterprise updating the asset.

As evident from FIGS. 1 and 2 amongst the assets of a user are FEDs and/or PEDs that connect to the network 100 which may be different to the electronic device(s) that the user exploits when communicating to the DSDAP 360. For example, a user with a pair of HP laptops may also have a HP wireless printer as well as a Linksys™ wireless router, a pair of wireless TV receivers, and Apple™ iPad™ which all provide wireless interfaces in addition to a Nikon camera, 3 Kobo™ eReaders, and four Apple™ iPod™ MP3 and multimedia players. Accordingly, if we assume that all the wireless devices will possess Internet Protocol (IP) addresses then through the DSDAP application and DSDAP the user may, for example, set that one or more of these devices is provided automatically with a software/firmware update wherein the DSDAP will interface to the one or more devices to manage the transfer of the update to it/them. Alternatively, the user may receive one or more notifications associated with these devices according to the schedule they define at which point if the user accepts an update within a notification then the DSDAP will interface to the one or more devices to manage the transfer of the update to it/them. In other embodiments and/or instances the devices, e.g. Nikon camera, may not have network interfaces, IP addresses etc. Accordingly, the DSDAP upon a user's PED and/or FED may notify the DSDAP 360 of the updates/upgrades that the user wishes to accept and the DSDAP 360 then establishes a sequence with the user for interfacing the asset(s) to their PED and/or FED in order to transfer the update/upgrade to the asset(s).

Now referring to FIG. 4 there is depicted an exemplary schematic for a user purchasing assets and associating these with their assets in order to provide access to product related information such as firmware upgrades, product offers, recall notices, memberships, annual renewals etc. without disclosing any or additional personal information to the manufacturer, retailer, etc. The exemplary schematic in FIG. 4 is similar to that of FIG. 3 in that the user 310 visits the retail outlet 320 but now purchases multiple assets 430 from multiple manufacturers and receives an electronic receipt 455 from the retail outlet 320 on an email account which they access on their PED 450. Accordingly the user 310 can subsequently upload the receipt 455, or a subset of the receipt 455, to their account with DSDAP 360 wherein it is stored within the DSDAP server(s) 390. As before the retail outlet 320 transmits product data but now transmits first to fourth product data 470A to 470D respectively to first to fourth remote servers 480A to 480D respectively, as well as others potentially which are not shown for clarity, via network 100. The first to fourth product data 470A to 470D respectively transmitted from retail outlet 320 to their databases upon first to third remote servers 480A to 480D respectively, may include the retailer's stock keeping unit (SKU), the manufacturer's original SKU, a third party enterprise SKU (e.g. a distributor) as well as data relating to unique identity of the asset, quantity, time, location, retailer employee, payment method, and user financial payment data. Subsequently, the retailer systems upon third remote server 480C, for example, provide to others, e.g. a distributor, the manufacturer, etc. information relating to the sale of the asset. This information may include, for example, the unique identity of the asset, quantity, time, and location of sale such that the distributor/manufacturer recognize the sales of the retailer associated with retail outlet 320 is transmitted via network 100 to a database server, which may for example be fourth server 480D or one of first to third remote servers 480A to 480C respectively.

The retailer systems upon third remote server 480C, for example, may also be provided with additional information which is captured at this point of sale time with respect to the sale including, but not limited to, retailer service plan information, product basic warranty information, and an enhanced warranty plan purchased by the user. Subsequently, this information or a subset of this information may be provided to one or more third parties associated with these aspects of the purchase. For example, the manufacturer may be advised the user purchased an enhanced service plan provided by the manufacturer, a third party service plan provider to the retailer may be advised of the details of the new service plan, and a local service provider be advised of service plan details. In other embodiments of the invention periodic reminders may be automatically established in one or more of these enterprises as well as the user's electronic calendar(s), social media profiles/timelines etc. or within the APP itself.

Accordingly, in this embodiment of the invention with first to fourth product data 470A to 470D respectively relating to multiple asset manufacturers the DSDAP 360 now maintains records for the new purchases by the user 310 for these assets and asset manufacturers such that upgrades/updates etc. for all assets and asset manufacturers are maintained and scheduled in notifications according to the user settings. If the user in making these asset purchases associates a plan, including but not limited to a subscription plan, a warranty plan, a usage plan, and an upgrade plan, with one or more these assets 430 then the DSDAP 360 may also track the plan(s) such that the user can easily access them where necessary to get their asset replaced, repaired, upgraded etc. Where the plan has a renewal, e.g. an annual renewal, then the DSDAP 360 may provide reminder notifications to the user 310 or in other embodiments of the invention where the user 310 associates financial data, e.g. credit card data, with their account the DSDAP 360 may perform the renewal as the DSDAP 360 has all user data, financial data, and asset data.

Now referring to FIG. 5 there is depicted an exemplary schematic for a user purchasing assets and associating them with their other assets in order to provide access to product related information such as firmware upgrades, product offers, recall notices, memberships, annual renewals etc.

without disclosing any or additional personal information to the manufacturer, retailer, etc. The exemplary schematic in FIG. 5 is similar to those of FIGS. 3 and 4 in that the user 310 purchases multiple assets but now does so for products from multiple manufacturers through multiple websites on their PED 550. As depicted the user makes purchases from first to third websites 520A to 520C respectively representing Kijiji™, eBay™, and digiCircle™ respectively. It would be evident to one skilled in the art that websites such as first to third websites 520A to 520C respectively and many others provide the user with the means to purchase assets either at a discount to retailers such as those also operating retail outlet 320 or to purchase used assets, discontinued assets, assets not available in their jurisdiction etc. Further, some websites such as first and second websites 520A and 520B respectively, representing Kijiji™, eBay™, are marketplaces/conglomerations of thousands, tens of thousands, even hundreds of thousands of individuals, small enterprises etc. globally.

Accordingly, these vendors on first to third websites 520A to 520C respectively are not providing data to the original asset manufacturer. Hence, upon receipt of the asset(s) from each purchase on the first to third websites 520A to 520C respectively the user accesses the DSDAP 360 to generate an entry for the asset by providing what information the user 310 possesses including, for example, manufacturer, model number, serial number, images captured of product labelling, product identification etc. Product labelling images are depicted as first to third images 570A to 570C respectively. Based upon the information provided by the user the DSDAP 360 may access one or more databases including, but not limited to, those on first to third remote servers 580A to 580C respectively relating to manufacturers, manufacturing reference databases etc. The DSDAP 360 may also access other databases including, but not limited to, product databases such as Wize™, UPC Database (e.g. www.http://upcdatabase.org/) etc.

Once the DSDAP 360 finds a matching product then it may engage with the manufacturer's databases and registration software to establish a registration in respect of the user's asset but protecting the user's personal data such that subsequently upgrades, updates etc. In some embodiments of the invention the DSDAP 360 may establish, based upon information provided by the user directly or acquired, for example, through the DSDAP 360 communicating to the asset, that the current firmware, software, upgrade status are out of date or behind the current versions from the asset manufacturer. Accordingly, the DSDAP 360 may provide the user with a specific notification relating to updating the asset to current manufacturer supported version(s) which may require that multiple historical upgrades are executed sequentially.

Figure 6A:
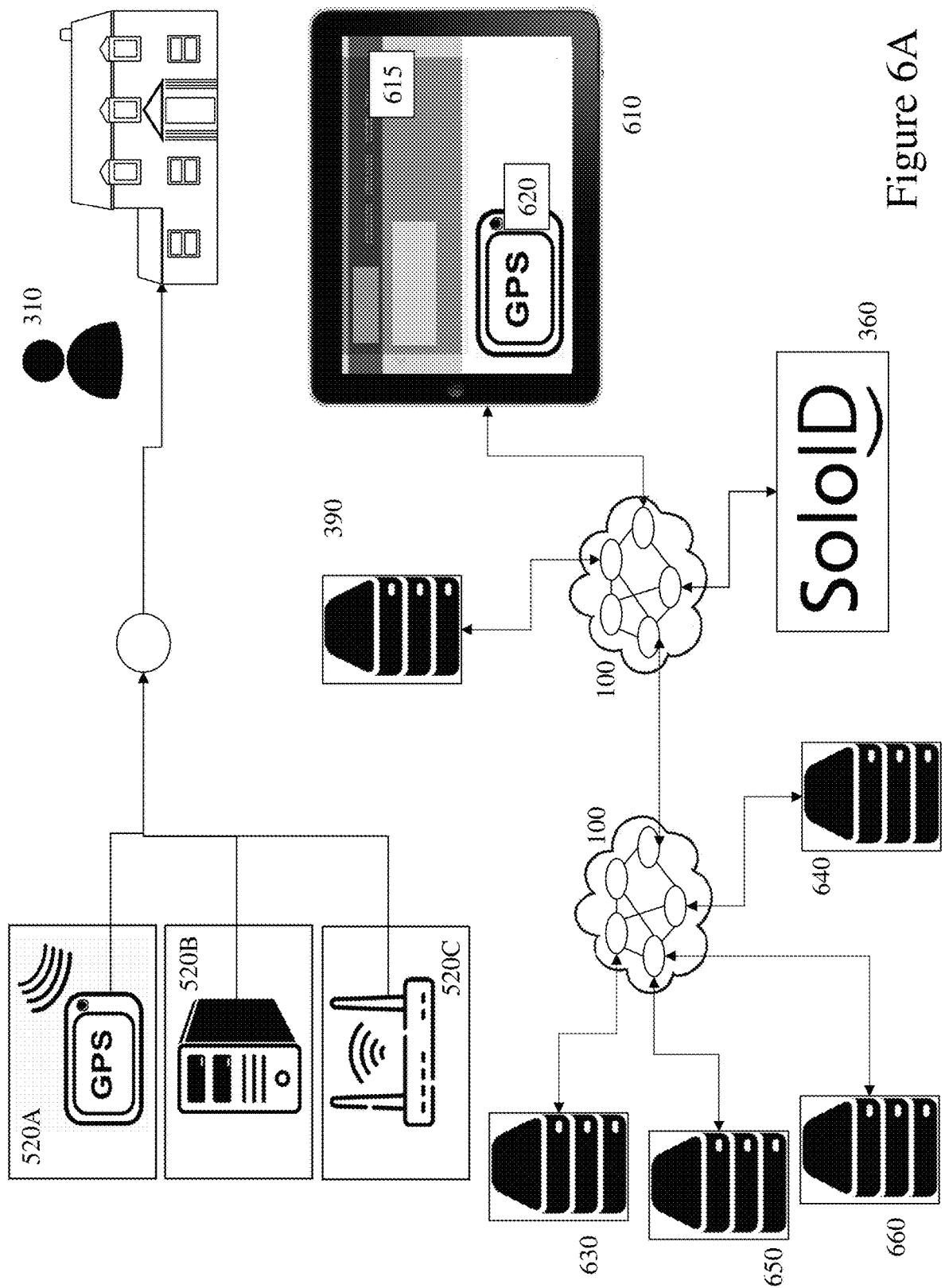
FIG. 6A depicts an asset data relationship application according to an embodiment of the invention with respect to advertising.

Now referring to FIG. 6A there is depicted an asset data relationship application according to an embodiment of the invention with respect to advertising. As depicted the user makes purchases, such as described above in respect of FIG. 5 from first to third websites 520A to 520C respectively representing Kijiji™, eBay™, and digiCircle™ respectively. Accordingly, the DSDAP 360 now has a perspective of the assets/purchasing pattern of user 310. Accordingly, when the user executes an application, user interface, web browser etc. upon a PED 610 which is associated itself within the DSDAP 360 database stored within DSDAP server(s) 390 those elements within the application, user interface, web browser etc. that are associated with advertising content, such as field 620 within email splash screen 615, are parsed through an advertising filter in execution upon an advertising server 630 which utilizes the user's asset purchasing history and characteristics derived therefrom to select advertising content from one or more advertising content providers hosting advertising content upon first to third advertising content servers 640 to 660 respectively.

Accordingly, for example on Jun. 11, 2014 a user in Ottawa, Canada when accessing the Yahoo™ email splash screen would have been provided with an advertisement in respect of "Ready-to-Drink" tasting events being held by the Liquor Control Board of Ontario (LCBO) in Ottawa on Jun. 12-14, 2014. However, as the user 310 in this instance is registered with DSDAP 360 and has previously purchased a 4 Tb 3.5" external hard drive from Kijiji™, first website 520A, a 50 ft Molded Cat6 Patch Cable from eBay™, second website 520B, and a Wireless 802.11n Router from digiCircle™, third website 520C. In this instance the user is presented with an advertisement from BestBuy™ relating to an AC1200 Wi-Fi Range Extender manufactured by Netgear™.

Accordingly, advertisements may be targeted based upon the historical asset acquisition profile of the user. Optionally, this may be correlated with other user asset histories such as those within a similar demographic, e.g. age, sex, race, religion, or combination thereof where that information has been provided or acquired by DSDAP 360 or with others having correlated asset histories. For example, users with historical asset purchases of multiple large screen TVs, gaming console(s), stainless steel appliances, etc. making asset acquisitions of a crib, baby clothing, etc. and owning vehicles within a particular portion of the car market have typically within 3-6 months made a change in their vehicle to one within a different portion of the car market, e.g. trading a compact for a SUV.

Figure 6B:
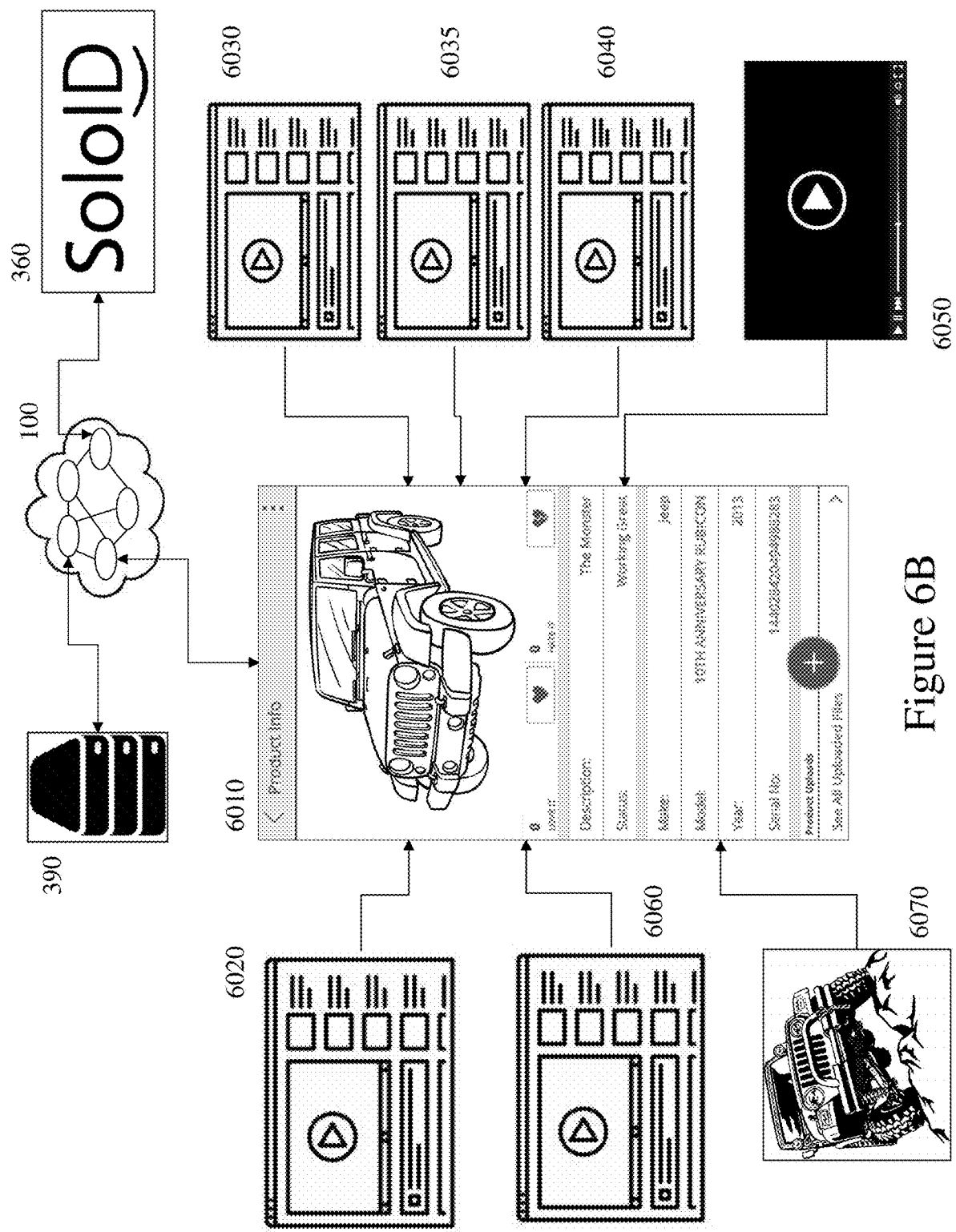
FIGS. 6B and 6C depict an asset data relationship application according to an embodiment of the invention for content association to an asset or assets of a user.

This is extended in Figures and 6B there is depicted an asset data relationship application according to an embodiment of the invention for content association to an asset or assets of a user. Accordingly, the user has established an account upon a DSDAP 360 and uploaded information relating to an asset 6010, in this instance a 2013 Jeep Rubicon, wherein this information is stored within DSDAP server(s) 390 for subsequent retrieval in respect of notifications, upgrades, recalls, updates etc. issued by the asset manufacturer, i.e. Jeep a division of Chrysler Group LLC. Subsequently, the user may during their other activities identify content that they wish to associate with an asset within their asset registry. This may be either as a result of accessing the content through the DSDAP 360 or within one or more applications whilst the DSDAP 360 is in execution in background for linking for example. Alternatively the DSDAP 36-0 may establish a toolbar within an Internet browser, for example, to provide tools for the user to select and associate content with an asset. Accordingly, the user can associate an item of electronic content, e.g. song, image, video, website, document, link, hyperlink, etc. to an asset, e.g. asset 6010. As depicted in FIG. 6B the user over a period of time associates a SOCNET profile 6020, first to third websites 6030, 6035 and 6040 respectively, video 6050, enterprise website 6060 and image 6070. Accordingly, these may be associated through one or more techniques known within the prior art such as the DSDAP 360 providing an icon on the user's PED/FED allowing the user to tap/swipe the currently displayed content to the application, right tapping content and selecting option to associate with DSDAP asset pool wherein subsequently user is prompted as to which asset 6010 they actually wish to associate the content to. Other options would be evident to one skilled in the art.

Figure 6C:
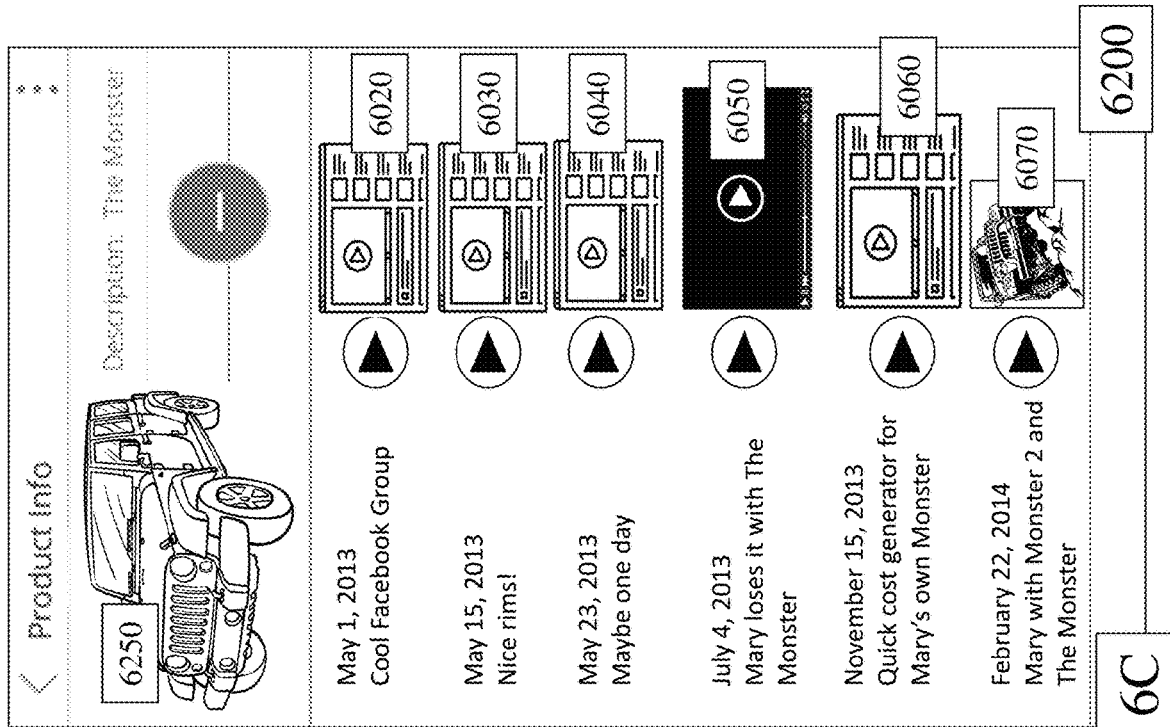
Figure 6C:
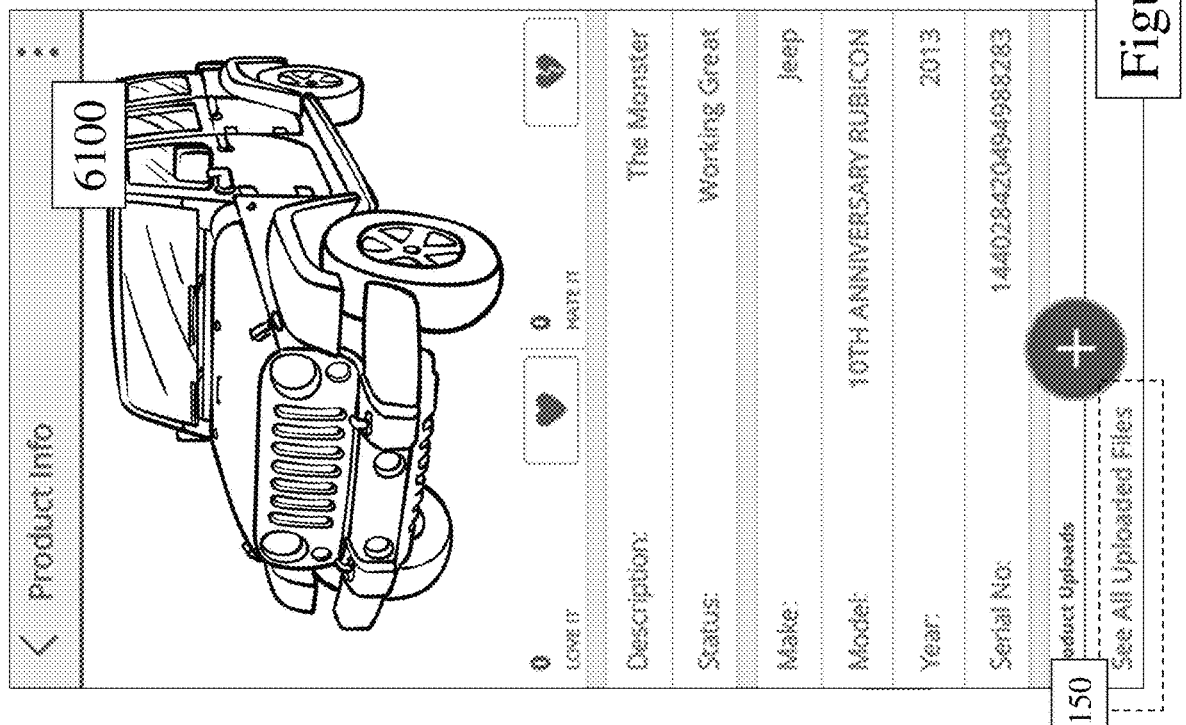

Subsequently as depicted in FIG. 6C the user upon accessing the asset 6100 within the DSDAP may select toolbar option 6150 to view the uploaded files wherein the display changes to that depicted in second screen image 6200 wherein the asset 6100 is depicted through image 6250 or alternatively if no image is available through text etc. or a combination of images and texts or image and a subset of text. Alternatively, the user may be directed directly to second screen image 6200 or may access this through one or more other actions other than selecting toolbar option 6150. Accordingly, below this are a partial view of uploaded content, which as with FIG. 6B are a SOCNET profile 6020, first and third websites 6030 and 6040 respectively, video 6050, enterprise website 6060 and image 6070 but now the user has been able to subsequently add a comment to each item within the associated content. If the associated content becomes larger than can be displayed within a single screen, e.g. second website 6035 is not visible, then scroll features such as known within the art may be provided to allow the user to scroll through the content they have associated to an asset in order to view the item they wish. Optionally, the upper portion of second screen image 6020 may include the provisioning of filter options to the user including, but not limited to, type of content, date range, and keyword(s).

Accordingly, a user may as they are browsing, searching, etc. on the Internet may attach that item to an asset within the DSDAP. The user may attach with one of several methods including, but not limited to, voice command, tap to link, and copy and paste. In this manner, rather than the user maintaining a large number of bookmarks or losing reference to items of interest they can associate the content to an asset. Accordingly, in the example depicted in FIGS. 6B and 6C the user has associated content such as replacement parts, conversion kits, etc. to their asset so that at a later date they can return and find the content with ease as it is associated with an asset. Accordingly, the user 310 in association with FIGS. 6A to 6C respectively may in addition to asset 610 (6100), their Jeep Rubicon, also have registered as assets a 2012 Ford Mustang, a 2013 Ford Escape, and a GE Fridge. As they are surfing/browsing electronic content on the Internet then they can rather than merely bookmarking it for a subsequent activity they now can attach the electronic content to the asset within the DSDAP. This, it would be evident to one skilled in the art, provides marketing/advertising enterprises etc. with valuable content as now not only is it known what content the user considers important but it has a context previously inaccessible unless an explicit reference was made by the user within a SOCNET, blog, etc. and these posts were analysed.

It would also be evident that the association made by the user of content to an asset may include additional information such as the context of the user at the time of the association which may include, geolocation, user context (e.g. home, work, garage, mall, etc.), whether associated with user alone or with family, friends, etc. as well as potentially biometric sensor data and/or lifestyle monitoring data.

For example, consider that 17,000 consumers all connect a single item of electronic content to the same asset, e.g. GE 25.9 cubic foot Side-by-Side Refrigerator, or a same brand/category of asset, e.g. GE and refrigerator, and that item was a news feed relating to bad fridge water in automatic ice makers. This information is now highly valuable to GE as evidently a large number of owners of their refrigerators are concerned by this news item. Accordingly, GE can take action to all of that category's asset owners or to only those who have made the association with the DSDAP. This information may also be important to a third party enterprise, e.g. a competitor, or a supplier of ice making systems to GE for example.

As noted above this linking may be performed in one or more manners including, for example, the user highlights what they wish to attach (or right click on webpage or choose a browser plug-in button or button) and select "Attach to SoloID", wherein SoloID, operating the service to store this relationship, is a DSDAP provider based in Ontario, Canada. As noted above the user may identify the asset to which the association is made, or elect to "like", save, store or copy the data to the DSDAP wherein this information is related back to the user's assets. Alternatively, a DSDAP algorithm parses the electronic content identified by the user, e.g. article, website, image, video, etc., in order to extract keywords which may match a product name, product manufacturer, model number, product category, etc. wherein a match to an asset of the user within the DSDAP will automatically tie the electronic content to their asset. For example, an article including keywords "Ford" and "Mustang" will attach that article to the Ford Mustang asset in the user's DSDAP so that they can review it subsequently or have a future reference to it. If the article does not match to a single asset but multiple, e.g. the article is about Ford, then it prompts the user "Which Asset? The Mustang or Escape?" where it detects multiple match options. If there is no correlation, e.g. the article is about wood fired AGA cooking/heating ranges then it may prompt the user to add to an asset within an associated category, e.g. kitchen, or whether a new asset is to be created wherein subsequently the user when completing the purchase of a range may be asked whether to associate the previously generated asset that has no asset details to the newly purchased asset. In this manner a user may create references to a new asset prior to its actual purchase. Such information is also important to retailers, marketers, advertisers, etc.

It would be evident to one skilled in the art that in a similar manner as the knowledge of the asset(s) and electronic content associated by the user are important to advertisers, marketing enterprises, retailers, etc. that this information can also be leveraged to improve the content/relevancy of electronic content identified during a search for the user. Accordingly, the DSDAP knows whether a user has linked content to their product and as evident from other embodiments of the invention described below in respect of FIGS. 7 and 8 has made comments in respect of an asset, irrespective of content and whether positive and/or negative. Accordingly, a user may have rated an asset in a website, linked content to the asset, etc. Accordingly, the databases associated with the DSDAP stored within the DSDAP server(s) 390 know that a user owns a Honda Model 545 Lawnmower and accordingly third parties as discussed can derive value from the viewing of additional information on the Honda Model 545. Perhaps the user is looking up maintenance help, spare parts, etc. and accordingly perhaps a well-timed special offer from a Honda retailer may garner replacement as might a timely advertisement/offer from a retailer selling Husqvarna and Troy Bilt lawnmowers at the higher end of the pricing spectrum as the user demographic is 50+ male and hence potentially receptive to increasing expenditure for longer term product reliability.

Accordingly, the DSDAP may by connecting facts such as that a user watched, liked or saved a video to their asset, or just watched it and maybe rated it, become an Internet resource allowing others to establish which videos are either valid/related or viewed as appropriate/good in respect of solving an issue on the Honda 545 Lawnmower. For example, if videos from one series posted by a retailer, e.g. Home Hardware, are consistently associated with Honda 545 Lawnmowers by owners/users then this information is now relevant to other search engines relationships as perhaps these videos were not the most viewed and hence under normal search algorithms would not appear as high but in fact these are the most highly rated by owners of the actual asset rather than the entire global population searching and browsing. Accordingly, this information would allow other search engines, e.g. Yahoo™, Google™, and Bing™ to increase the relevancy of the results to users overall and significantly increase this relevancy where the user also owns that asset. Accordingly, if the user enters "How to replace cutting blade" rather than returning all search results that fit with the normal algorithms being applied the search engine may establish that the user owns a Greenworks lawnmower and hence automatically weights results to this with a simple option block at the top of the page as currently appears where a search result slightly different to the one entered by the user is performed. So, for example, the user is presented with filtered results for Greenworks lawnmowers but the top of the results says "Filtered for Greenworks lawnmowers. OK?" with simple option of click "No" if not and simply proceeding with displayed list if it is OK.

The search algorithm(s) may also consider the fact that a user did not like a video or item of electronic content, and accordingly may push those and similar search results down the search result listing. Optionally, they may be discarded.

Figure 7:
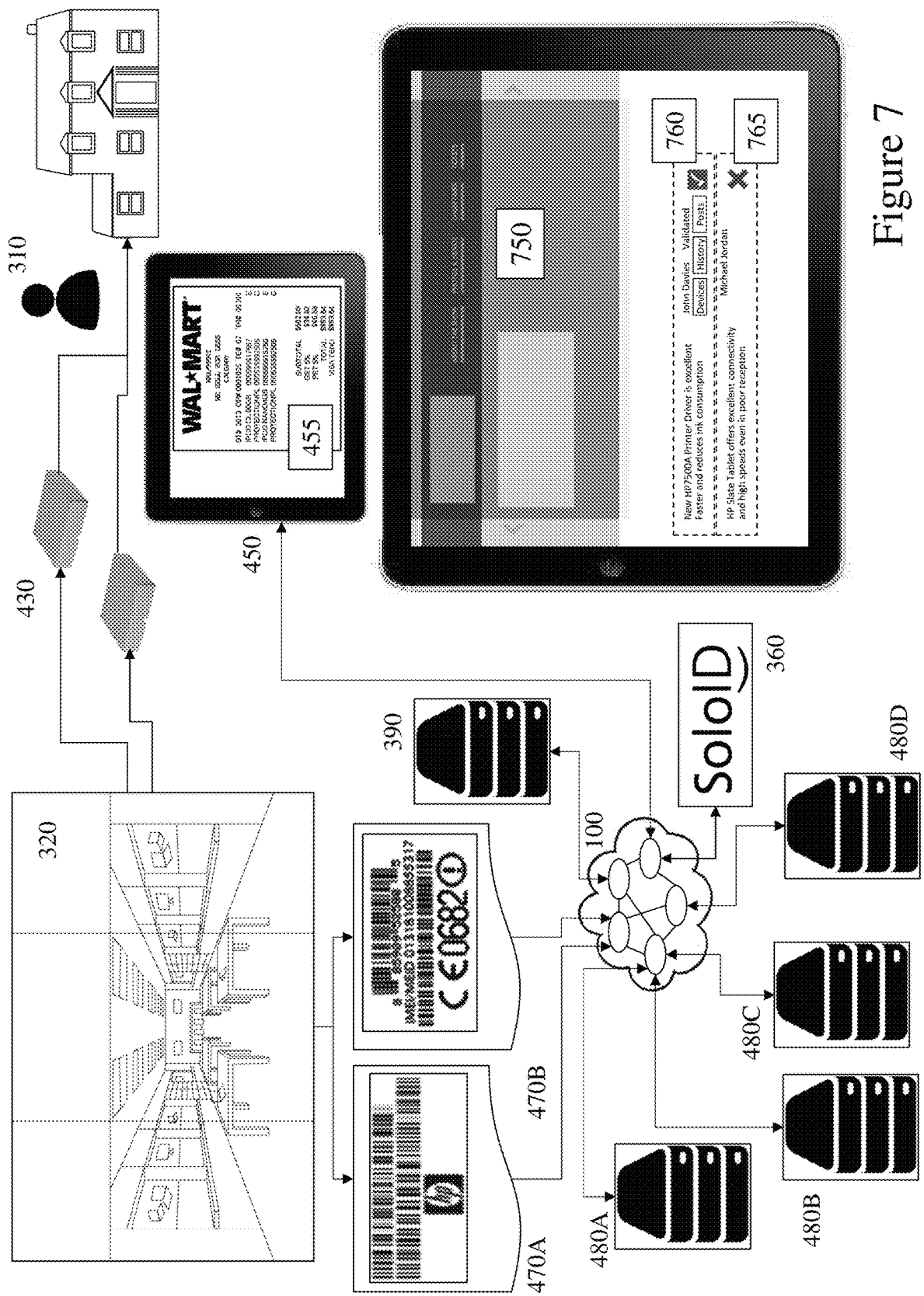
FIGS. 7 and 8 depict asset based user vetting according to embodiments of the invention.
Figure 8:
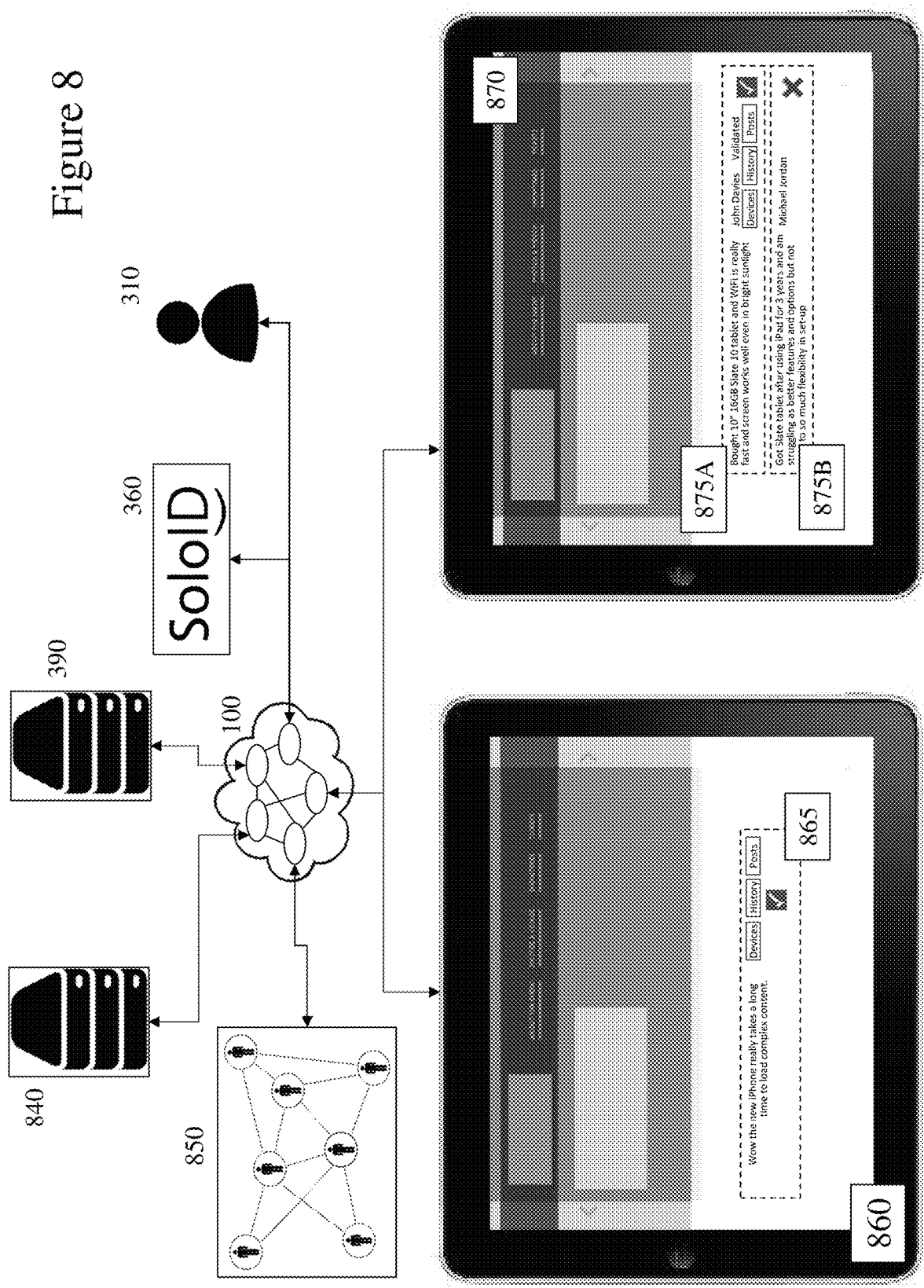

Now referring to FIGS. 7 and 8 respectively there are depict asset based user vetting systems according to embodiments of the invention. As depicted in FIG. 7 a user 310 has visited a retail outlet 320, purchased multiple assets 430 from multiple manufacturers and receives an electronic receipt 455 from the retail outlet 320 on an email account which they access on their PED 450. Accordingly the user 310 can subsequently upload the receipt 455 to their account with DSDAP 360 wherein it is stored within the DSDAP server(s) 390. As before the retail outlet 320 transmits product data but now transmits first and second product data 470A and 470B respectively to one or more of first to fourth remote servers 480A to 480D respectively, as well as others potentially which are not shown for clarity, via network 100. The first and second product data 470A and 470B respectively transmitted from retail outlet 320 to their databases upon first to fourth remote servers 480A to 480D respectively, may include the retailer's stock keeping unit (SKU), the manufacturer's original SKU, a third party enterprise SKU (e.g. a distributor) as well as data relating to unique identity of the asset, quantity, time, location, retailer employee, payment method, and user financial payment data. Subsequently, the retailer systems upon fourth remote server 480D, for example, provide to others, e.g. a distributor, the manufacturer, etc. information relating to the sale of the asset. This information may include, for example, the unique identity of the asset, quantity, time, and location of sale such that the distributor/manufacturer recognize the sales of the retailer associated with retail outlet 320 is transmitted via network 100 to a database server, which may for example be one of first to fourth remote servers 480A to 480D respectively.

Subsequently, the user accesses a website/webpage 750 relating to a manufacturer and provides a posting onto the website/webpage 750. As this process is performed the DSDAP identifies that the manufacturer associated with the website/webpage 750 matches a manufacturer of one or more assets of the user as being from that manufacturer. Accordingly, this information is provided to the website/webpage 750 together with data relating to the posting/content added by the user. In this manner the website/webpage 750 can establish that the user is a verified owner of an asset or assets manufactured by the manufacturer associated with website/webpage 750 or even more specifically the category/product of website/webpage 750 wherein the website/webpage 750 is specific to category/product. However, as the DSDAP is performing these steps the associations are made in a manner that the user remains anonymous from the manufacturer and the DSDAP allows connections to be established relating to verified purchases from unrelated parties. Accordingly, as depicted a first posting 760 is associated with a verified/validated user whereas second posting 765 is not a verified/validated user. Accordingly, another user when viewing the website/webpage 750 may see the status of the different posters and make a judgment as to the validity of the comments by each.

Additionally, for a verified/validated user the website/webpage 750 may provide additional information according to preferences established by the user associated with the post such as the assets the user owns, the history of the user, and other posts of the user. Accordingly, a user owning Apple products is potentially more reputable than another user posting comments about Apple products that does not own them and similarly comments about an Apple TV when the user only owns an Apple iPod Nano™ has potentially little merit or validity. These concepts are extended in FIG. 8 with asset based user vetting systems according to embodiments of the invention into social media and third party websites. Accordingly with first screen shot 860 a user 310 has made a posting onto a SOCNET 850 hosted on remote server 840 relating to an Apple™ iPhone™ wherein the post was parsed to ascertain content establishing the term "iPhone" wherein the DSDAP 360 through DSDAP server 390 validates whether the user has an Apple™ iPhone™ and upon determining that the user 310 does provides validation data to the SOCNET 850 such that another user reading the post can see that the user has a verified status and similarly, according to the preferences of the user and/or SOCNET 850, may be able to additional information according to preferences established by the user associated with the post such as the assets the user owns, the history of the user, and other posts of the user. In a similar manner two user posts 875A and 875B are depicted with respect to an enterprise's website in second screen shot 870. In this instance, the enterprise BestBuy™ is a retailer and another user has selected to search for "hp slate" in respect of the HP Slate tablet range of PEDs. Amongst the returned results are postings from user including posts 875A and 875B wherein again parsing of content of the posts and verification/validation of the user through DSAP 360 and DSDAP server 390 allows the other user to see that first post 875A comes from a user "John Davies" who has been validated/verified as an owner of a HP Slate tablet whereas second post 875B from "Michael Jordan" has not been verified.

Figure 9:
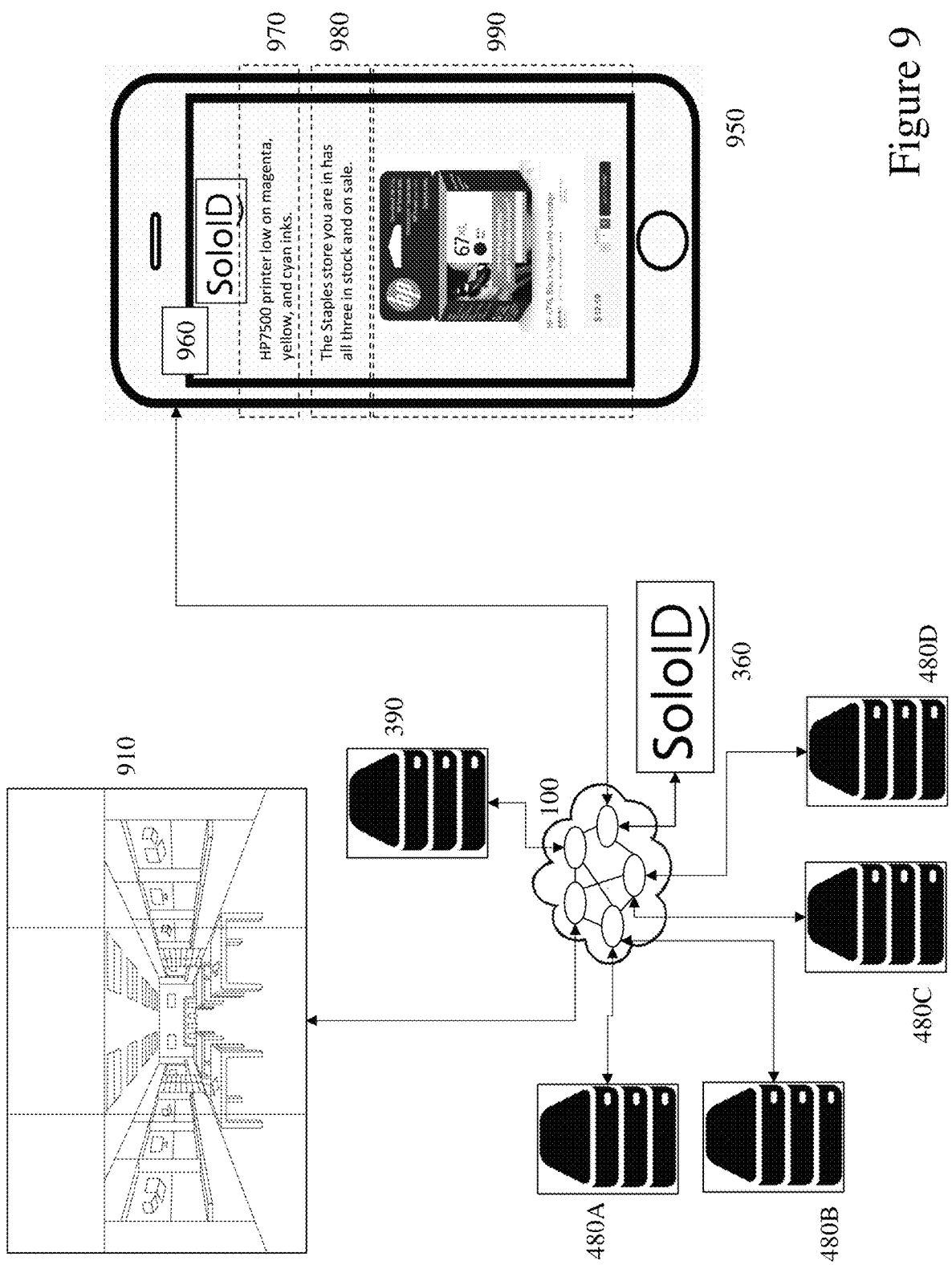
FIGS. 9 and 10 depict an asset data relationship application relating to user notifications according to embodiments of the invention.
Figure 10:
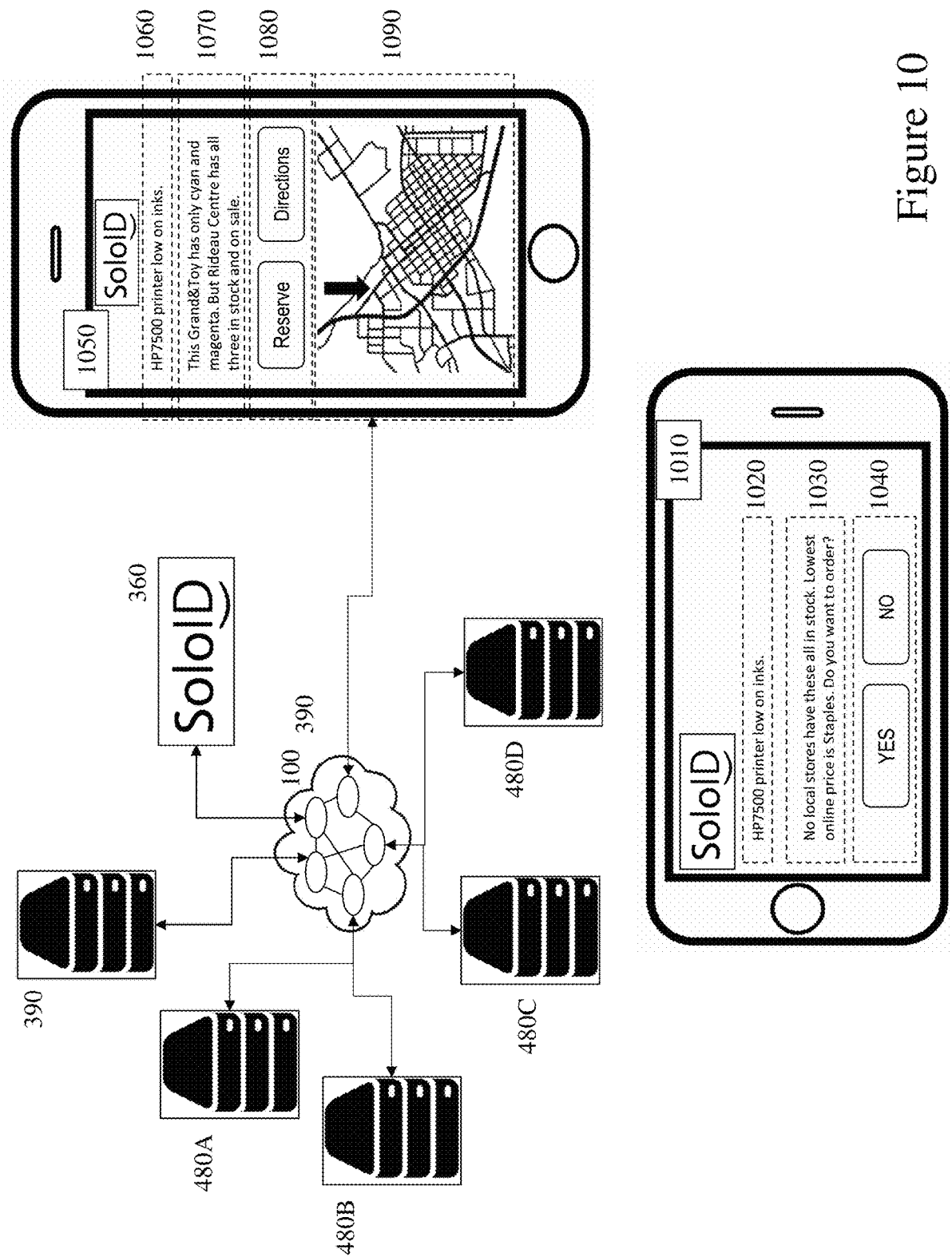

Now referring to FIGS. 9 and 10 there are depicted asset data relationship applications relating to user notifications according to embodiments of the invention. As discussed supra in respect of embodiments of the invention in FIGS. 3 through 8 a user may associate assets to a profile within a DSDAP 360 and also associate content to those assets. Within FIGS. 3 to 5 the emphasis was primarily to notifications, upgrades, updates relating to the assets from the viewpoint of manufacturer/retailer driven communications. However, it would be evident that a notification may also be communicated from an asset to the DSDAP 360 either directly through network 100, for example, or indirectly via another asset of the user. For example, a printer may advise that all or specific toner cartridges are low or an air filter may advise that it is time to change the air filter. In some instances these notifications to the DSDAP 360 and thence to the user will include identification information of the part(s) to be replaced and/or required. However, in other instances these notifications will not include such information wherein the user must normally revert to either removing the part(s) to establish an identity/SKU/part code or seek a manual to establish. However, with a DSDAP 360 in the event that the identity is not known but the asset identity is the DSDAP 360 may within some embodiments of the invention perform a search of the manufacturer, retailer, etc. databases and online content to establish the identity of the required part(s) which are then associated within the database on DSDAP server 390 of DSDAP 360. (Such databases and online content being stored within first to fourth remote servers 480A to 480D respectively. In other embodiments of the invention the user must acquire and enter these associations.

Further, where the DSDAP 360 has the identities of the part(s) required it may perform a search in order to identify options for acquiring the part(s) for the user. Accordingly, based upon the location of the user the DSDAP 360, may, within the DSDAP databases upon DSDAP server 390 have established retailers associated with specific products/service/assets and/or categories of assets/service/products or it may dynamically establish these based upon a search through a mapping resource such as Google™ Maps, Yahoo™ Maps, Bing™ Maps, MapQuest™ etc. Optionally, such a search may be employed to associate retailers and retail locations for a user for subsequent storage/retrieval/use. Alternatively, the requirement for the part(s) may be stored and the DSDAP dynamically searches based upon establishing that the user is now within a retail environment supplying the part(s) or a subset of the parts. In the embodiment depicted in FIG. 9 the DSDAP has been notified by a HP printer that it requires magenta, yellow and cyan ink cartridges and the DSDAP has established that for the specific HP printer of the user defined as their asset that the appropriate replacement cartridges are HP920XL Magenta, HP920XL Yellow and HP920XL Cyan. The DSDAP 360 has also established that the user is now within retailer 910, that these are in stock, and extracted the relevant content from the retailer 910 website.

Alternatively, warranty or subscription information may be stored such that a predetermined period of time prior to the expiration the DSDAP may look for a new warranty renewal price or subscription plan pricing and provide the user with a notification not only of an impending expiry but also with one or more offers to extend the warranty or subscription.

Once, the associations have been made then the user may be provided with a notification via DSDAP 360 such as notification 960 in FIG. 9 upon their PED 950 including, but not limited to:
    Notification Data 970—"HP7500 printer low on magenta, yellow, and cyan inks";
    Location Data 980—"The Staples store you are in has all three in stock and on sale"; and
    Product Data 990—indicating the part required, a visual of the packaging if available, and pricing information.

Optionally, some retailers may also be able to provide the DSDAP 360 with in-store location information to help guide the user quickly to the required part(s). Alternatively, the notification 1050 as depicted in FIG. 10 provided to user upon their PED may through algorithms/processes in execution by DSDAP 360 on the DSAP server 390 provide the user with other information including, but not limited to:
    Notification Data 1060—"HP7500 printer low on inks";
    Location Data 1070—"This Grand&Toy has only cyan and magenta. But Rideau Centre has all three in stock and on sale";
    Selection Data 1080—providing the user with options to "Reserve" (as the store offers an online reservation for products) and "Directions" (providing the user with directions to the store indicated as having stock); and
    Map Data 1090—providing a visual indication of the user's current location and the location of the other store.

Optionally, Selection Data 1080 may include other options in addition to or instead of those depicted in FIG. 10 including, but not limited to, "order for pickup", "order and ship", etc. according to the retailer and "search other retailers". Also as indicated in second notification 1010 in the event that no local store to the user has the required part(s) in stock then the notification 1010 comprises information including, but not limited to:
    Notification Data 1020—"HP7500 printer low on inks"
    Message Data 1030—"No local stores have these all in stock. Lowest online price is Staples. Do you want to order?"
    Option Data 1040—providing the user with options to confirm and place an order or not place an order.

Optionally, the user may be provided with the notification(s) through one or more applications including, but not limited to, the DSDAP 360 in execution upon their PED/FED. Other applications may include email, social media, etc. as well as where the DSDAP 360 is in execution or not a pop-up window on their FED/PED with or without an audible or visible message/notification.

Optionally, the user may configure the DSDAP 360 to automatically order any part(s) identified by the asset. It would be evident also that the user may, when purchasing an asset, establish within the DSDAP 360 an option for the DSDAP 360 to automatically order those part(s) necessary for maintenance of the asset according to the maintenance schedule/replacement schedule etc. of the asset manufacturer. In instances where the user purchases the asset used then they may also, if the previous owner of the asset was also registered with the DSDAP, receive information regarding previous activities associated with the asset. It would be evident that a user may also associate with an asset images of the spare parts acquired with their identity/serial no. information etc. or may alternatively add these as an asset itself allowing all of the other features of the DSDAP to be applied to it. For example, a replacement exhaust for their Ford Mustang might be tracked.

Optionally, the DSDAP allows a user to associate assets into a group/cluster/family. Optionally, the DSDAP would also allow a user to manage assets for a number of users, e.g. a parent may manage assets for their children but their accounts are subsequently separable, e.g. as they reach 18 years of age for example. Alternatively, a user may transfer assets from one account to another or allow them to subsequently transfer assets to a family member as they turn 18 for example. Alternatively transfer of an asset may be made from a seller's DSDAP account to a buyer's DSDAP account such that upgrade/update/service history may be similarly transferred to the buyer. In these instances the option to delete personal content associated with the asset may be provided to the user. Alternatively, when content is added to an asset it may be categorized into one of several categories, either automatically provided by the DSDAP or created by the user, which can may include personal, general, service, etc. such that by default only the maintenance record is transferred unless the seller/user making the transfer approves transfer of the personal and/or general elements.

Accordingly, it would be evident that in embodiments of the invention anonymous product ownership may be established so that other users/data partners to the DSDAP may access data relating to a particular asset to answer a query or return results for a search/query. For example, a query to the Home Depot website "What Oil should I buy from Home Depot?" results in the Home Depot's website shopping application now being able to read the DSDAP database, ascertain what products the query initiator has, and now knows what products the user has have that require oil and returns results. As the DSDAP knows the user's assets then optionally this process acquires recommendations from either one or all of the asset's manufacturer, a distributor, a retailer or a third party known to have related information, and can also engage another server to make recommendations from other users with the same or a similarly related asset in order to make the best recommendation. It could also look to what other oil was "liked" by the same product owners, so a new suggestion from others can be incorporated into the results. The "like" can also come from another database, so that in essence the DSDAP may establish an overall sentiment of other like owners of the same asset and the parts that these other users like rather than being limited to a single viewpoint from a single website. In these latter instances the DSDAP user identities are kept anonymous whereas in the first query the user may identify to the Home Depot website that are a DSDAP user and provide a unique identifier provided to them from the DSDAP or at user's suggestion which means the DSDAP knows who the user is but the Home Depot software system do not.

Figure 11:
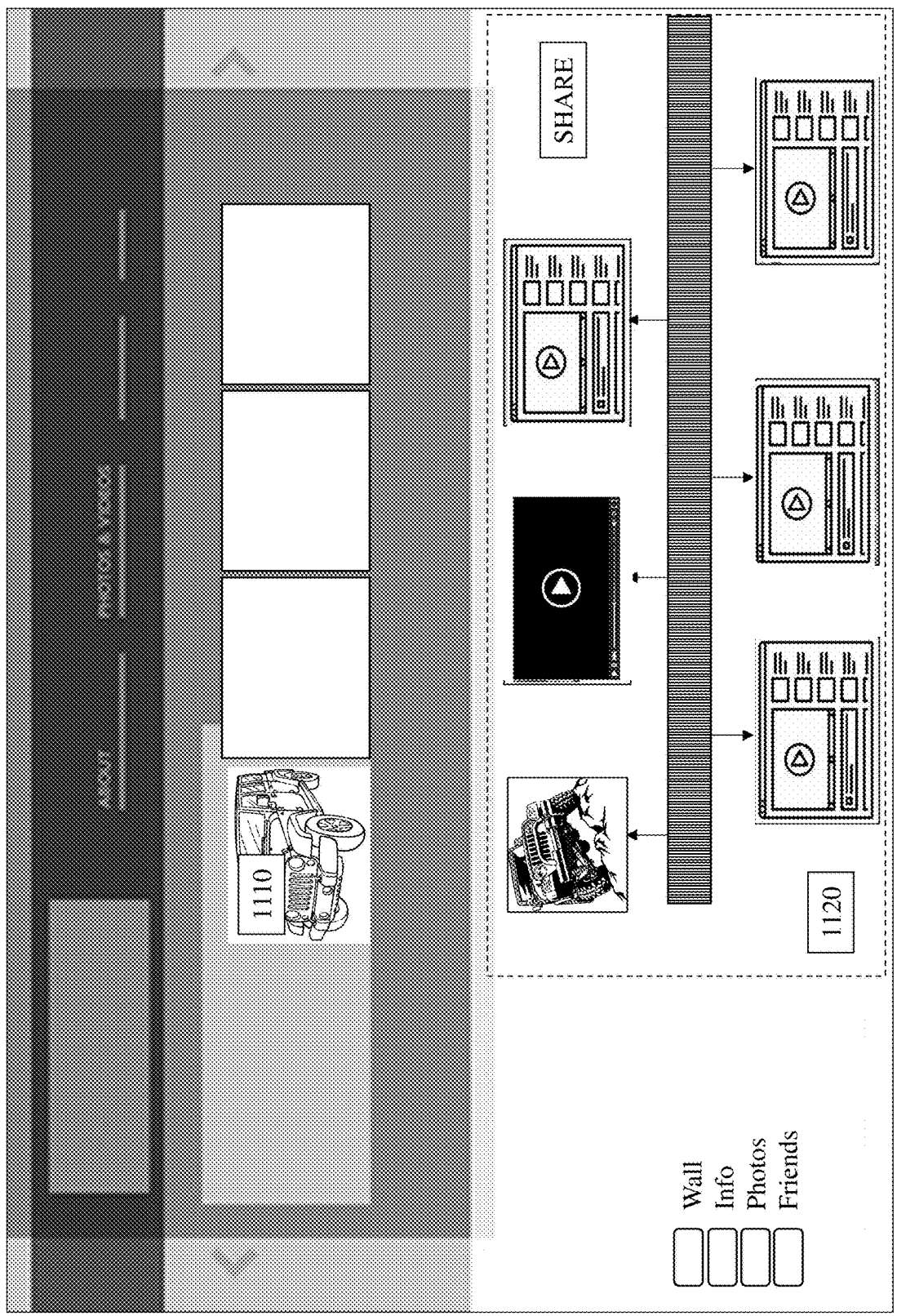
FIG. 11 depict an asset data relationship application relating to timeline based presentation of content associated to an asset or assets of a user according to embodiments of the invention.

Within other embodiments of the invention a product timeline may be established. One example being that depicted in FIG. 6C where the user established a timeline in respect of an asset. However, as indicated in FIG. 11 this may be extended such that the user generated timeline may be accessed by those within the SOCNET of the user such that these friends may then themselves associated content within the SOCNET. Accordingly, the user may associate an asset 1110 within the DSDAP to their SOCNET profile, or even make the profile page solely about the asset 1110 potentially. With the association of the asset 1110 to the SOCNET the SOCNET may extract the associated content within the DSDAP associated with the asset 1110 and present this as part of the SOCNET if another user selects the asset 1110, for example. Accordingly, other users may associate within the SOCNET their own content to the asset 1110 which may or may not be mirrored back to the DSDAP according to the SOCNET/DSDAP and/or preferences established by the user.

As a user associates additional content to their asset then by virtue of electing whether to share/publish or maintain as private the content that they provide then their externally viewable timeline associated with an asset may adjust to reflect the shared or published content whilst the user's own timeline will evolve to include all the associated content/data. In the event that a third party is associating data, e.g. a new warranty for the user's washing machine then the user may be prompted to determine whether to add or keep private that information. Alternatively, the user may have established rules for adding content and/or modified or merely accepted rules within the DSDAP relating to the inclusion of content within private and public timelines.

Whilst FIGS. 6B, 6C and 11 depict the association of electronic content such as websites, webpages, blogs, images, etc. it would be evident that other sources of content may be associated including, but not limited to, scanned content, voice messages, dictated messages, sound, visual content, multimedia content, sentiments, sentiment categories, and aromas. Optionally, the DSDAP allows a user to update/change an assets sentiment, meaning their present ratings by selecting one or more choices of sentiments/ratings/codes offered and therefore their present satisfaction of the asset or the present data tied to this asset. Such sentiment data may have an effect of allowing for the calculation of events between sentiment/rating choices, including failure time intervals or time between certain events. It will also allow users to establish other user's sentiments as a function of time with an asset as initial satisfaction/dissatisfaction may be reversed or ameliorated over a period of time of owning the asset.

The asset a user adds can be linked to their loyalty card and the user can add notes to the assets on their loyalty card or flag the item as having an issue or rate the asset and the loyalty card maker can see this information either through public feeds of that user's assets, either anonymously or not, or through acquiring a subset of data they read from the user's loyalty card or from another source which is getting access to this data.

Optionally, where within the DSDAP an upgrade/update notification relates to an asset of a user then the notification may itself become part of the timeline of the product and may be similarly pushed to one or more SOCNETs with or without the association of the asset to the SOCNET(s). Accordingly, a user may access their Facebook™ page, for example, and see a notification relating to their Microsoft™ Office suite that a new service pack is available. Alternatively, the user may be following a communal online asset specific product feature, e.g. a Twitter account (i.e. @HP7500 for a HP7500 Wide Format Printer or @Ford-Edge for the Ford™ Edge vehicle). As a result the DSDAP may display a real-time running list of all posts, links and images attached to an asset, so this is either the user or a company can be following in real-time per item feed of data as well as establishing historical analysis. Selection of the notification and/or confirmation of the update/upgrade may in addition to triggering the required downloading/installation etc. of firmware/software updates add the date/time together with update/upgrade to the timeline of the asset so that subsequently the user can see the sequence of updates/upgrades. It would be evident that subsequently other users within the SOCNET(s) may therefore friend, follow, subscribe, like, etc. the asset and/or its associated timeline etc.

As discussed in respect of FIGS. 9 and 10 supra a DSDAP may push notifications to a user based upon the asset(s) associated with the user and the consumable materials, spare parts, replacement parts, etc. in accordance to on demand or scheduled activities relating to the asset(s). Within an embodiment of the invention, according to user preferences for example, the asset data for a user may be accessed by a retailer either from the user's DSDAP account or based upon data accessible within the DSDAP application upon the user's PED. Accordingly, a user has purchased a refrigerator at Home Depot™ and accordingly already knows this about the user. However, rather than the DSDAP pushing a notification to the user about the consumable materials, spare parts, replacement parts, etc. the user enters another retailer, e.g. Lowes™, which can now ascertain that user purchased the refrigerator, that the water filter is due for replacement within a predetermined period of time, and present an offer to the user based upon the fact that they are in their store now and will have this requirement. If the water filter was not in stock then the offer may be suppressed to avoid alienating the user. Similarly, the DSDAP may, having previously provided the notification to a user regarding replacing the water filter, note that the new water filter has not been added as an asset or associated item to the refrigerator and that the user is within a retail outlet having the water filter and provides a prompt to the user to acquire the water filter asset.

It would be evident that the concepts disclosed with the embodiments of the invention also provide the ability for a retailer to give a user an exclusive "buy it now offer" price which is confidential only to that user and potentially specifically priced for that user. For example, a user assets may overlap heavily with a retailer in terms of spares, replacement parts, etc. and accordingly attracting the user has a benefit to the retailer. Accordingly, the DSDAP may in essence broker a better deal because the retailer now knows the user assets and requirements and their timing so can provide an offer geared to those specific requirements. Further, the DSDAP may communicate to the retailer with or without the user's intervention. For example, the retailer now knows that the user should be, in addition to purchasing replacement wiper blades for their Ford Mustang, scheduling an oil change/brake replacement in 2 weeks. Accordingly, the retailer can offer a deal to secure the oil change/ brake replacement and schedule this rather than leaving the second aspect unaddressed and within the prior art unknown. Optionally, the DSDAP may "negotiate" and reject an offer. The retailer may submit a new offer, especially if knowing the geolocation and/or other information, impacts the decision of the user. Equally, where a user wishes to dispose of an asset then the DSDAP may negotiate the same as the user undertakes other activities that, for whatever reason, leads them to retailers who purchase assets of the category/type they are seeking to dispose. Accordingly, for example, a user may wish to dispose of a TV and when entering Wal-Mart™ is made an offer on a new TV including a sale of the user's current asset to Wal-Mart™ or the offer is only an asset disposal and store credit. The store credit may be higher than the cash value the retailer offers as they know they are then completing the sale of one or more other assets.

Such concepts may be extended to include what may be referred to as "Anonymously Intent Casting" wherein the DSDAP, based upon the knowledge of the user's assets and their status/requirements may establish an offer or offers in respect of a need/requirement without the user being engaged or even knowing that they have the need/requirement at that point in time. Accordingly, the DSDAP may determine the need for something, e.g. either by a refrigerator notifying the DSDAP of the requirement or it being established upon a schedule/notification, and obtaining data relating to satisfying the requirement/need. The extent of the requirement/need may be very broad based upon the user such that, for example, a user with a lawnmower may establish a schedule for lawn cutting and the application seeks offers to provide that service to the user. The asset may, alternatively, be the lawn rather than a lawnmower as the user expects the successful bidder to provide this service on the lawn.

Within embodiments of the invention the DSDAP may anonymously place the user's requirement/need upon one more web sites, web services, wherein it is bid on by suppliers rather than the DSDAP simply collecting pricing information from multiple retailers online. Optionally, the user may control which suppliers are able or allowed to bid. The received bids are collected, collated, filtered, etc. as appropriate before the user is presented with only the "appropriate" or relevant "offers" meeting their criteria.

Within embodiments of the invention variations may include, but are not limited to, the following:

1: The DSPAP may preselect one or more suppliers, receive data, notify the user to review and optionally accept and even pay for the item and have it shipped;
2: A user may be ranked as a good buyer, based on your ownership/purchase ranking by suppliers or by manufacturers proving they are an owner of certain products based on accepted warranty registrations;
3: A user may exploit friends to a predetermined degree of "depth" to establish suppliers they like/rate highly so that the system accepts bids only from them, or weights the "offer" based upon their rating(s);
4: Bids may be accepted from suppliers trying to offer a reduction or even give something away free as they wish to establish access to your friends;
5: Ranking of you (a Buyer) is based on "Vetted Ownership" rating by suppliers;
6: Suppliers can be ranked based upon "Vetted Ownership" ratings from other users and/or those of friends or those within predefined geographical region(s);
7: Algorithms may be tuned and information joined with other algorithms and data sources internally and externally to consider a user's weightings;
8: Algorithms may be triggered to accept deals that are more than a predetermined percentage and/or value lower than lowest price notified by retailers within the user preferences even if the offering retailer is outside those preferences. Such an offer may for example be generated based upon the retailer seeing the user's vetted buyer rating (or points within a system of vetted ownership profile) so that they wish to become a retailer the user selects/uses.

As the DSDAP possesses within its database(s) a list of assets by user then the DSDAP also offers users with a system that can act as the central clearing for addressing issues such as lost, found, stolen, recovered assets. Within the prior art the use of identification tags and reward offers is the most well-known and prevalent method for returning lost objects to their owners. For example, tags may be placed on luggage, cell phones, computer equipment, or any object capable of being lost, and making it possible for the finder to locate the owner to arrange for return and possible reward by the owner to the finder. However, such identification tags have certain disadvantages, for example, they may reveal the owner's name, address, and possibly phone numbers, causing loss of privacy and security risks. Many owners will not use identification tags which reveal their true names, etc., because the risk of unethical people misusing that discovering and misusing that information is too high.

Accordingly, encoding the information whilst it provides identity and data protection requires that the user register with a third party, and for the finder to return the lost object to the third party who, in turn, returns the lost object to the owner. Many such prior art techniques have included exploiting bar codes, RFID stickers, and attaching other elements to the asset wherein the user assigns the unique identity of the tag, label, etc. to the asset within the third party database. However, an individual finding an item may access a DSDAP according to an embodiment of the invention and enter data relating to the asset found which may be a tag, label, etc. as within the prior art but alternatively may simply be a serial number of the product which is then processed by the DSDAP to identify a matching asset within the database wherein the user associated with the asset may be contacted by the DSDAP. Based upon a response provided by the user associated with the asset several options may be triggered including, but not limited to, the following:

Establishing electronic communication between user and individual to schedule/manage return of the asset;

Providing a printable courier/postal label for the individual to attach wherein the delivery information is only provided to the courier/postal service once the DSDAP is advised the asset with the label attached is entered into the courier/postal service system; and Arranging for the individual to drop the asset at a partnership retailer to the DSDAP wherein the partnership retailer arranges for the asset to be dropped off at a retail outlet close to the individual and transferred to a retail outlet close to the user for collection wherein the partnership retailer may charge a fee or view the partnership with the DSDAP as part of their overall marketing and customer awareness/retention activities.

It would be evident that such methodologies may also be employed by authorities, insurance companies etc. to locate the owners of recovered assets.

Within FIGS. 6B and 6C a circular icon is depicted as part of the user interface. Usually, such an icon is associated with the user interface displayed and its function defined by the user interface it forms part of. However, within another embodiment of the invention an icon or button may be continuously displayed in a predetermined location, e.g. bottom centre of the screen, but now the function of that icon or button varies according to the user interface currently displayed of which the icon or button is not a predefined element. Accordingly, the action may be based upon the content of, the subject of, the context of, the user interface currently displayed to the user. The icon/button may be established by an application in execution upon the user's PED, for example, separate to that of the DSDAP, but communicating with it. Accordingly, this may be an "ADD NEW" control function wherein it triggers an "Add New Warranty" function when the user interface focus is onto warranty information and the function changes to "Add New Photo" when the user interface focus is to image, for example. Accordingly, a user may be viewing warranty information on a retailer website, selects the icon, is presented with a list of assets the retailer sells that align to assets within the user's asset list on the DSDAP wherein the user selects an asset and is transferred to that portion of the retailer website allowing the user to purchase a warranty. Optionally, the icon/button function may be limited to one function except upon specifically themed web pages.

Within many aspects of embodiments of the invention as well as other applications, software suites etc. a user is required to enter text. Today, this is achieved either by providing the user with a scrollable list of predetermined options that are triggered through selecting an icon next to the blank/defaulted text field or the user typing the keyword. In the former instance the software application is configured with the lists and accordingly the user cannot select options outside the preconfigured list. However, according to an embodiment of the invention, an application may provide an overlay to another software application wherein when the user wishes to enter text into a field they touch the screen within the field and hold. A word, e.g. "Select" comes up, and unless the user moves their finger disappears and no action is performed. If the user moves their finger, for example, up/down or left/right then the text within the field appears to scroll. It may, for example, default to starting with the letter M, or alternatively, A or Z or another letter the application determines as appropriate. A small finger movement scrolls the list slowly and a larger movement faster. Once the appropriate keyword is found and the user stops touching the screen. The selected word is then parsed to the application with the text field as the selected option. Accordingly, rather than all software applications having to update their scroll list options only one is updated and accessed by all software applications. The available options within the scroll list can be contextually defined by the software application requiring the text entry. Hence, within an application "Car Make" may be displayed and the user scrolls until they select Ford™. Next they touch the "Model" field and the contextually aware interface now displays a list of Ford™ vehicles allowing the user to select Escape. However, if the user was within a car dealership website then the list would be today's available models but within the DSDAP wherein an asset may be any prior or current Ford then the list would be significantly longer as indeed the list of car makers would include manufacturers no longer in existence or brands subsumed by re-branding etc.

Figure 12:
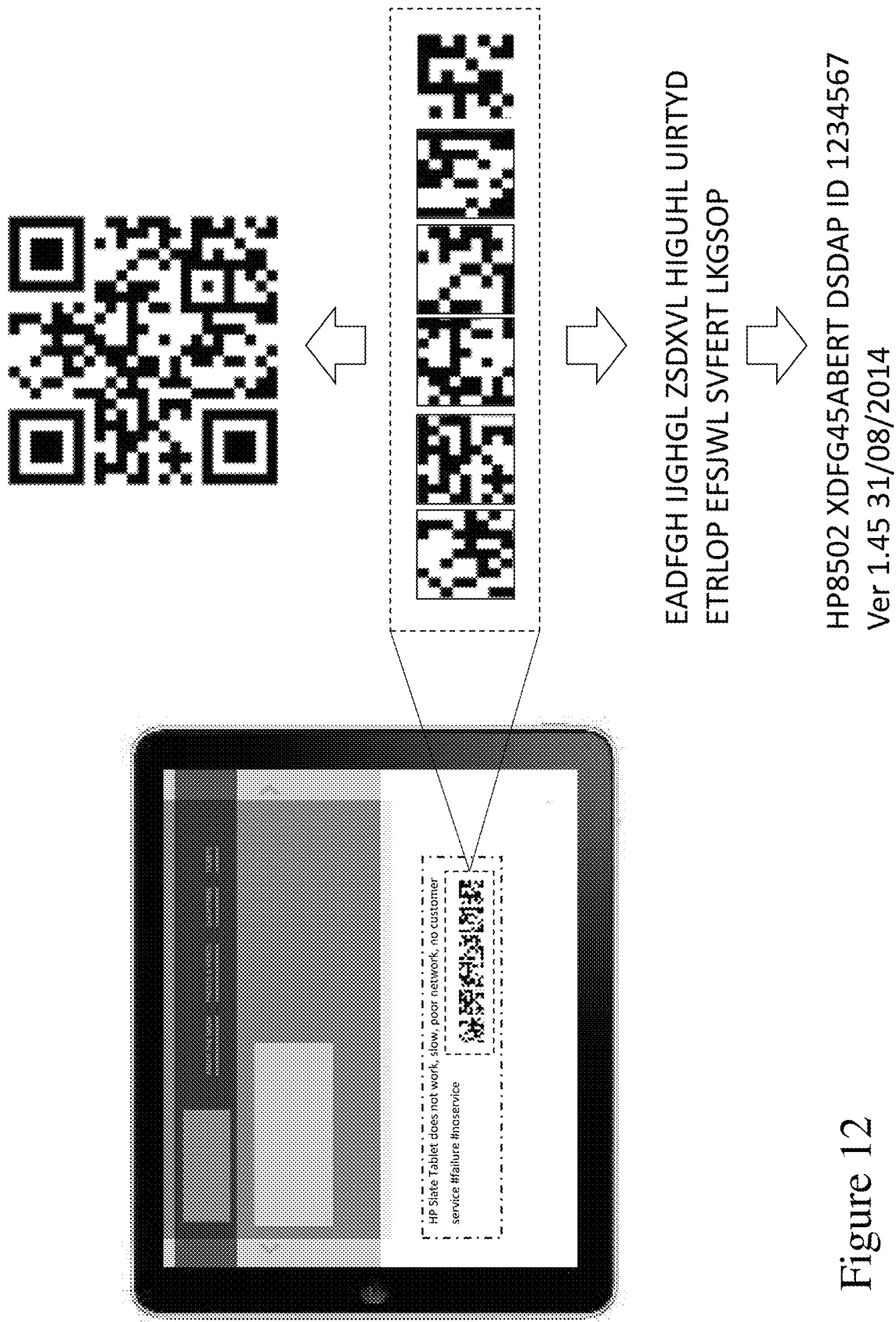
FIG. 12 depicts the posting of a message to a social media website by a user exploiting glyph based content according to an embodiment of the invention.

Within many SOCNETs and other applications linkage to a Twitter feed/comment etc. is provided. Twitter gained popularity from limiting messages to 140 characters. However, according to some embodiments of the invention a user making a posting may not wish everyone to see all the content and accordingly it would be beneficial to provide users within the DSDAP and other applications with the ability to embed additional information within the Tweet or other communication that they post. Accordingly, as indicated in FIG. 12 a user makes a posting to a SOCNET of a retailer, manufacturer, service provider etc. in respect of an asset the user has acquired. Unlike standard messages from users within the SOCNET the posting also includes within it what the inventor refers to as a "hieroglyphic" image or "glyph". The glyph may be read by an associated application or web service, which then provides more detailed information relating to the user, their comment(s), and/or the asset for example. For example, the glyph is encrypted/encoded using a key or keys generated by the DSDAP based upon the text provided by the user. The DSDAP may, for example, provide the encryption key only to the manufacturer of the asset where the user is a verified owner of the asset. Accordingly, a user may make a comment about a Sony product, for example, and within the glyphs embed additional information which Sony can subsequently extract. Alternatively, the glyph may be encrypted and friends of the user in their SOCNET(s) may be provided the decryption code such that they can view the additional comments within, for example, defined SOCNETs such as Facebook™. Optionally, the user may grant access to a retailer but not the manufacturer, for example. Optionally, the glyphs may exploit colour coding as well as the overlay of multiple codes with different colours allowing a single code read to generate multiple items of data where data is associated with different codes. For example, a Version 1 QR code with 21×21 pixel count, e.g. green or red, may be overlaid with a Version 3 QR code with 29×29 pixel count, e.g. blue or black.

Within an alternate embodiment of the invention the user may initially post the message with the glyph and associate with the message a time limit which if the user does not remove or cancel, for example, will result in the message being re-posted with the glyph decrypted and posted for all to view. Accordingly, the user may tweet a message regarding an issue, for example with Verizon's cellular service, and if the user does not cancel it then the glyph is decrypted. However, as noted supra the posting may have been made anonymously and the exploded glyph whilst exposing the issue maintains the user's anonymity.

As evident from FIG. 12 a glyph set may be attached to a posting, e.g. a series of 6 9×9 pixel images, e.g. 9×9 image representing 9 ASCII characters such that these may be decoded in one route to 54 characters which are then decrypted to a message or alternatively recompiled to form a QR code that then provides information.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of verifying to a third party viewing online content relating to an asset is posted by a user who is the legitimate owner of the asset; the method comprising
receiving, at a server, from the user first data uploaded from an electronic device associated with the user, the first data relating to an electronic receipt relating to the purchase of the asset;
storing within a database accessible to the server an entry associated with an identity of the user, the entry comprising asset information relating to the asset purchased by the user identified within the electronic receipt;
receiving, at the server, from the user second data relating to a webpage to which they wish to post content;
receiving, at the server, from the user third data relating to content to be posted to the webpage;
automatically establishing a manufacturer associated with the webpage to which the content is to be posted;
determining whether the manufacturer is the manufacturer of the asset for which the entry exists within the database in dependence upon only the first data; and
upon a positive determination transmitting from the server to the webpage the content and an indication that the user posting the content is a verified purchaser of the asset; wherein
the indication transmitted with the content when rendered on the webpage with the content to the third party indicates that the user posting the content is a verified purchaser of an asset made by the manufacturer; and
the first data uploaded from the electronic device extracted from the electronic receipt is a description of the asset acquired with that electronic receipt and is independent of any unique identifier of at least one of:
the electronic receipt by a retailer issuing that electronic receipt of the plurality of receipts; and
the manufacturer associated with the webpage to which the content is to be posted.

2. The method according to claim 1, wherein
the determination as to whether the manufacturer is the manufacturer of an asset for which an entry exists within the database also includes determining whether the webpage to which the content is to be posted is associated with a product which matches the identified asset of the manufacturer.

3. The method according to claim 1, further comprising:
transmitting upon the positive determination additional information established by the user associated with the content being posted to the webpage; wherein
the additional information relates to one or more categories selected from one or more of assets owned by the user, a history of the user, and other posts made by the user;
the webpage when posting the content also includes one or more links, each link associated with a category of the one or more categories to which the additional information relates.

4. The method according to claim 1, wherein
the identity of the user remains anonymous from the manufacturer.

5. The method according to claim 1, further comprising
receiving fourth data from the user relating to the content to be posted to the webpage, the fourth data relating to whether the user wishes to make a portion of the content to be viewable only by one or more predetermined entities rather than all viewers of the post; wherein
upon determining the user wishes to make the portion of the content to be viewable only by one or more predetermined entities the server:
encrypts the portion of the content into a plurality of glyphs, each glyph being encrypted with an encryption key or a plurality of encryption keys;
transmits the plurality of glyphs with the remainder of the post for display by the webpage as part of the post; and
transmits the encryption key or the plurality of encryption keys to the one or more predetermined entities.

6. The method according to claim 5, wherein
at least one of:
each glyph of the plurality of glyphs is one of a quick response code, a one dimensional bar code and a two dimensional bar code; and
a glyph of the plurality of glyphs exploits colour coding such that it comprises at least a first code to be rendered in a first colour and a second code to be rendered in a second colour, each of the first code and second code relating to different item within the portion of the content to be viewable only by the one or more predetermined entities.

7. The system according to claim 5, wherein
the first computer executable instructions when executed by the first microprocessor further configure the first server to:
receive fifth data from the user relating to a time limit for that portion of the content the user wishes to be viewable only by one or more predetermined entities to be viewable by one or more predetermined entities;
determine whether the time limit has passed without the first server receiving an indication from the user to remove or cancel that portion of the content; and
upon a positive determination re-posting that portion of the content unencrypted so it is viewable by all users.

8. The method according to claim 1, further comprising
encrypting a portion of the content into a plurality of glyphs, each glyph being encrypted with an encryption key or a plurality of encryption keys;
transmitting the plurality of glyphs with the remainder of the post for display by the webpage as part of the post; and
transmitting the one of the encryption key or the plurality of encryption keys to one or more predetermined entities; wherein
one or more predetermined entities are established by the user as being able to view that portion of the content.

9. The method according to claim 8, wherein
at least one of:
each glyph of the plurality of glyphs is one of a quick response code, a one dimensional bar code and a two dimensional bar code; and
a glyph of the plurality of glyphs exploits colour coding such that it comprises at least a first code to be rendered in a first colour and a second code to be rendered in a second colour, each of the first code and second code relating to different item within the portion of the content to be viewable only by the one or more predetermined entities.

10. The method according to claim 1, wherein
the electronic receipt is the last in a series of electronic receipts; and
the series of electronic receipts relate to a chain of title from the manufacturer of the asset to the user.

11. A system for displaying to a user of online content that a poster of an item of content relating to an asset within the online content is a legitimate owner of the asset by verification of the poster's asset with the manufacturer, the system comprising
a first server connected to a communications network comprising a first microprocessor and a first memory storing first computer executable instructions for execution by the first microprocessor; and
an electronic device also connected to the communications network associated with the user comprising a second microprocessor, a second memory storing second computer executable instructions for execution by the second microprocessor, and a display; wherein
the first computer executable instructions when executed by the first microprocessor configure the first server to:
store within a second memory accessible to the server database content to be rendered as online content;
receive from the user a request for the online content;
transmitting retrieved database content from the database in dependence upon the request; wherein
a first portion of the retrieved database content comprises postings made by one of more other users; and
a second portion of the retrieved database content comprises postings made by one or more further users and an indication for each posting within the second portion relating to a verification of the further user posting the content; and
the second computer executable instructions when executed by the second microprocessor configure the electronic device to:
render upon the display to the user the retrieved database content; wherein
the first portion of the retrieved database content is rendered absent a visual marker;
the second portion of the retrieved database content is rendered with a visual marker established in dependence upon the indication; and
the visual marker indicates to the user that the other user posting content forming part of the second portion of the retrieved database content is a verified purchaser of an asset made by the manufacturer.

12. The system according to claim 11, further comprising
a second server comprising a third microprocessor, a third memory storing third computer executable instructions for execution by the third microprocessor, and a third communications interface to connect the server to a communications network; wherein
the third computer executable instructions configure the second server to:
host a third social media application;
receive first data uploaded by an individual from an electronic device associated with the individual connected to the communications network, the first data relating to one or more electronic receipts relating to the purchase of a plurality of assets;
store within a database associated with an identity of the individual asset information relating to the plurality of assets purchased by the individual identified within the one or more electronic receipts;
receive from the individual second data relating to a webpage to which they wish to post content;
receive from the individual third data relating to content to be posted to the webpage;
automatically establish a manufacturer associated with website to which the content is to be posted and determine whether the manufacturer is the manufacturer of an asset for which an entry exists within the database;
upon a positive determination the second server transmits the content to the first server together with an indication that the individual posting the content is a verified purchaser of an asset made by the manufacturer; and
upon a negative determination the second server transmits only the content to the webpage;
the first computer executable instructions when executed by the first microprocessor further configure the first server to acquire the content to be stored within the database from the second server; and
the first data uploaded from the electronic device was extracted from each electronic receipt of the one or more electronic receipts is a description of those assets of the plurality of assets acquired with that electronic receipt of the plurality of receipts and is independent of any unique identifier of at least one of:
the electronic receipt of the plurality of receipts generated by a retailer issuing that electronic receipt of the plurality of receipts; and
the manufacturer associated with the website to which the content is to be posted.

13. The system according to claim 11, wherein
the determination as to whether the manufacturer is the manufacturer of an asset for which an entry exists within the database also includes determining whether the webpage to which the content is to be posted is associated with a product which matches the identified asset of the manufacturer.

14. The system according to claim 11, wherein
the third computer executable instructions further configure the second server to:
upon the positive determination transmit additional information established by the individual associated with the content being posted to the webpage; wherein the additional information relates to one or more categories selected from one or more of assets owned by the individual, a history of the individual, and other posts made by the individual;

the webpage when posting the content also includes one or more links, each link associated with a category of the one or more categories to which the additional information relates.

15. The system according to claim 11, wherein the third computer executable instructions further configure the second server to:

receive fourth data from the user relating to the content to be posted to the webpage, the fourth data relating to whether the user wishes to make a portion of the content to be viewable only by one or more predetermined entities rather than all viewers of the post; wherein upon determining the user wishes to make the portion of the content to be viewable only by one or more predetermined entities the server:

encrypts the portion of the content into a plurality of glyphs, each glyph being encrypted with an encryption key or a plurality of encryption keys;

transmits the plurality of glyphs with the remainder of the post for display by the webpage as part of the post; and transmits the encryption key or the plurality of encryption keys to the one or more predetermined entities.

16. The system according to claim 15, wherein at least one of:

each glyph is one of a quick response code, a one dimensional bar code and a two dimensional bar code; and a glyph of the plurality of glyphs exploits colour coding such that it comprises at least a first code to be rendered in a first colour and a second code to be rendered in a second colour, each of the first code and second code relating to different item within the portion of the content to be viewable only by the one or more predetermined entities.

17. The system according to claim 15, wherein the third computer executable instructions when executed by the third microprocessor further configure the second server to:

receive fifth data from the user relating to a time limit for that portion of the content the user wishes to be viewable only by one or more predetermined entities to be viewable by one or more predetermined entities;

determine whether the time limit has passed without the first server receiving an indication from the user to remove or cancel that portion of the content; and upon a positive determination re-posting that portion of the content unencrypted so it is viewable by all users.

18. The system according to claim 11, wherein one of:

all postings within the retrieved database content are transmitted and rendered with a plurality of glyphs;

all postings within the second portion of the retrieved database are transmitted and rendered with the plurality of glyphs; and postings made by a specific individual forming part of the postings within the second portion of the retrieved content are transmitted and rendered with the plurality of glyphs;

each glyph of the plurality of glyphs is encrypted with an encryption key or a plurality of encryption keys; and the systems transmits the encryption key or the plurality of encryption keys to the user who is one of a plurality of predetermined entities authorised to decrypt the plurality of glyphs.

19. The system according to claim 11, wherein the electronic receipt is the last in a series of electronic receipts; and the series of electronic receipts relate to a chain of title from the manufacturer of the asset to the user.

20. A system for verifying to a third party associated with online social media content that a poster of content relating to an asset is a legitimate owner of the asset; the system comprising a server comprising a first microprocessor, a first memory storing first computer executable instructions for execution by the first microprocessor, and a first communications interface to connect the server to a communications network; wherein the first computer executable instructions when executed by the first microprocessor configure the server to:

host a social media application;

receive from a user first data uploaded by the user from an electronic device associated with the user connected to the communications network, the first data relating to one or more electronic receipts relating to the purchase of a plurality of assets;

store within a database associated with an identity of the user asset information relating to the plurality of assets purchased by the user identified within the one or more electronic receipts;

receive from the user second data relating to a webpage to which they wish to post content;

receive from the user third data relating to content to be posted to the webpage;

automatically establish a manufacturer associated with the website to which the content is to be posted and determine whether the manufacturer is the manufacturer of an asset for which an entry exists within the database in dependence upon only the first data; wherein upon a positive determination the server transmits the content to the webpage together with an indication that the user posting the content is a verified purchaser of an asset made by the manufacturer;

upon a negative determination the server transmits only the content to the webpage;

the webpage upon rendering the content to the third party displays a visual marker in association with the rendered content that the user posting the content is a verified purchaser of an asset made by the manufacturer, the visual marker being displayed when the indication is present; and the first data uploaded from the electronic device was extracted from each electronic receipt of the one or more electronic receipts is a description of those assets of the plurality of assets acquired with that electronic receipt of the plurality of receipts and is independent of any unique identifier of the manufacturer associated with the website to which the content is to be posted.

21. The system according to claim 20, wherein
the electronic receipt is the last in a series of electronic receipts; and
the series of electronic receipts relate to a chain of title from the manufacturer of the asset to the user.

* * * * *